(12) United States Patent
Yang et al.

(10) Patent No.: US 11,736,749 B2
(45) Date of Patent: Aug. 22, 2023

(54) INTERACTIVE SERVICE PROCESSING METHOD AND SYSTEM, DEVICE, AND STORAGE MEDIUM

(71) Applicant: TENCENT TECHNOLOGY (SHENZHEN) COMPANY LIMITED, Shenzhen (CN)

(72) Inventors: Yanzhong Yang, Shenzhen (CN); Guanghui Ren, Shenzhen (CN); Ming An, Shenzhen (CN); Peng Chen, Shenzhen (CN); Chong Yuan, Shenzhen (CN); Dan Wang, Shenzhen (CN); Yudong Jin, Shenzhen (CN); Xiaochuan Cui, Shenzhen (CN); Haibin Sun, Shenzhen (CN); Hongyu Liu, Shenzhen (CN); Wei Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/525,958

(22) Filed: Nov. 14, 2021

(65) Prior Publication Data

US 2022/0078492 A1 Mar. 10, 2022

Related U.S. Application Data

(63) Continuation of application No. PCT/CN2020/119903, filed on Oct. 9, 2020.

(30) Foreign Application Priority Data

Dec. 13, 2019 (CN) .......................... 201911285719.3

(51) Int. Cl.
*H04N 21/2387* (2011.01)
*H04N 21/43* (2011.01)
(Continued)

(52) U.S. Cl.
CPC ....... *H04N 21/2387* (2013.01); *H04N 21/242* (2013.01); *H04N 21/43074* (2020.08); *H04N 21/8547* (2013.01)

(58) Field of Classification Search
CPC ............. H04N 21/2387; H04N 21/242; H04N 21/43074; H04N 21/8547; H04N 21/4402;
(Continued)

(56) References Cited

U.S. PATENT DOCUMENTS 6,570,996 B1 * 5/2003 Linnartz ............ H04N 1/00037
725/20
6,889,325 B1 * 5/2005 Sipman ................. H04L 63/126
380/37

(Continued)

FOREIGN PATENT DOCUMENTS

CN 101827250 A 9/2010
CN 104618806 A 5/2015
(Continued)

OTHER PUBLICATIONS

China National Intellectual Property Administration (CNIPA) Office Action 2 for 201911285719.3 dated May 6, 2022 9 Pages (including translation).

(Continued)

*Primary Examiner* — Michael B. Pierorazio
(74) *Attorney, Agent, or Firm* — Anova Law Group PLLC

(57) ABSTRACT

This application discloses an interactive service processing method and system, a device, and a storage medium, and belongs to the field of computer technologies. The method includes acquiring a video stream and interactive information corresponding to the video stream, the interactive information comprising an interactive timestamp and inter- (Continued)

active data; determining a transmission mode corresponding to the interactive information, the transmission mode comprising one of transmission based on a network channel and transmission with a video stream fragment as a medium; transmitting the video stream to a target terminal; and transmitting the interactive information to the target terminal based on the transmission mode corresponding to the interactive information, the target terminal being configured to process interactive service on the video stream according to the interactive timestamp and the interactive data in the interactive information.

20 Claims, 13 Drawing Sheets

(51) Int. Cl.
*H04N 21/242* (2011.01)
*H04N 21/8547* (2011.01)

(58) Field of Classification Search
CPC ........ H04N 21/440218; H04L 65/1083; H04L 65/4015; H04L 65/61; H04L 65/70
See application file for complete search history.

(56) References Cited

U.S. PATENT DOCUMENTS

| | | | | |
|---|---|---|---|---|
| 8,190,435 | B2* | 5/2012 | Li-Chun Wang | G10L 15/26 704/270 |
| 8,290,423 | B2* | 10/2012 | Wang | H04B 17/23 455/2.01 |
| 8,650,603 | B2* | 2/2014 | Doets | H04N 21/25891 725/38 |
| 8,688,600 | B2* | 4/2014 | Barton | G06Q 30/0601 84/603 |
| 8,725,829 | B2* | 5/2014 | Wang | G06Q 30/06 704/239 |
| 8,811,885 | B2* | 8/2014 | Wang | H04H 60/44 455/2.01 |
| 9,660,967 | B1* | 5/2017 | Paris | H04L 63/06 |
| 2002/0072982 | A1* | 6/2002 | Barton | G06Q 30/0625 705/14.1 |
| 2002/0083060 | A1* | 6/2002 | Wang | G11B 27/28 |
| 2004/0199387 | A1* | 10/2004 | Wang | G06Q 30/06 704/E15.045 |
| 2005/0028195 | A1* | 2/2005 | Feinleib | H04N 7/163 725/135 |
| 2005/0091274 | A1* | 4/2005 | Stanford | G06F 16/9577 |
| 2005/0192863 | A1* | 9/2005 | Mohan | G06Q 30/02 705/14.27 |
| 2005/0209917 | A1* | 9/2005 | Anderson | G06Q 30/0214 705/14.16 |
| 2006/0195359 | A1* | 8/2006 | Robinson | G06Q 30/0236 705/14.19 |
| 2006/0224452 | A1* | 10/2006 | Ng | G06Q 30/0226 705/14.27 |
| 2006/0256133 | A1* | 11/2006 | Rosenberg | G06F 3/013 345/619 |
| 2007/0124756 | A1* | 5/2007 | Covell | G06F 16/635 348/E7.071 |
| 2007/0130580 | A1* | 6/2007 | Covell | G11B 27/034 725/18 |
| 2007/0143778 | A1* | 6/2007 | Covell | H04N 21/8133 725/135 |
| 2007/0179850 | A1* | 8/2007 | Ganjon | G06Q 30/0236 705/14.27 |
| 2007/0192784 | A1* | 8/2007 | Postrel | H04N 21/4316 725/23 |
| 2007/0214049 | A1* | 9/2007 | Postrel | H04N 21/475 725/32 |
| 2008/0052062 | A1* | 2/2008 | Stanford | G10L 15/26 704/E15.045 |
| 2008/0065507 | A1 | 3/2008 | Morrison et al. | |
| 2009/0198701 | A1* | 8/2009 | Haileselassie | G06F 16/9535 |
| 2009/0217052 | A1* | 8/2009 | Baudry | G06T 1/0085 713/178 |
| 2009/0313670 | A1* | 12/2009 | Takao | H04N 21/47 725/110 |
| 2010/0034466 | A1* | 2/2010 | Jing | G06F 18/214 382/195 |
| 2010/0114713 | A1* | 5/2010 | Anderson | G06Q 20/10 705/14.69 |
| 2011/0273455 | A1* | 11/2011 | Powar | G11B 27/10 345/473 |
| 2012/0011545 | A1* | 1/2012 | Doets | H04N 21/8153 725/38 |
| 2012/0076310 | A1* | 3/2012 | DeBusk | G06F 2218/08 381/56 |
| 2012/0117596 | A1* | 5/2012 | Mountain | H04N 21/4147 725/39 |
| 2012/0124608 | A1* | 5/2012 | Postrel | G06Q 30/0215 725/23 |
| 2012/0191231 | A1* | 7/2012 | Wang | G06F 16/7834 700/94 |
| 2012/0221131 | A1* | 8/2012 | Wang | G06F 16/634 700/94 |
| 2012/0295560 | A1* | 11/2012 | Mufti | H04B 13/00 455/95 |
| 2012/0297400 | A1* | 11/2012 | Hill | G06F 9/445 719/318 |
| 2012/0316969 | A1* | 12/2012 | Metcalf, III | G06Q 30/0269 705/14.66 |
| 2012/0317240 | A1* | 12/2012 | Wang | H04H 60/37 709/219 |
| 2013/0010204 | A1* | 1/2013 | Wang | H04H 20/88 348/725 |
| 2013/0029762 | A1* | 1/2013 | Klappert | A63F 13/792 463/31 |
| 2013/0031579 | A1* | 1/2013 | Klappert | H04N 21/454 725/32 |
| 2013/0042262 | A1* | 2/2013 | Riethmueller | H04N 21/25866 725/14 |
| 2013/0044051 | A1* | 2/2013 | Jeong | H04N 21/44218 345/156 |
| 2013/0067512 | A1* | 3/2013 | Dion | G06Q 30/0251 725/32 |
| 2013/0073366 | A1* | 3/2013 | Heath | G06Q 30/0261 705/14.25 |
| 2013/0073377 | A1* | 3/2013 | Heath | G06Q 30/02 705/14.39 |
| 2013/0080242 | A1* | 3/2013 | Alhadeff | G06F 16/957 705/14.39 |
| 2013/0080262 | A1* | 3/2013 | Scott | G06Q 30/02 705/14.68 |
| 2013/0085828 | A1* | 4/2013 | Schuster | G06Q 30/0207 705/14.39 |
| 2013/0111519 | A1* | 5/2013 | Rice | G06Q 30/02 725/34 |
| 2013/0124073 | A1* | 5/2013 | Ren | G08G 1/00 701/118 |
| 2013/0194496 | A1* | 8/2013 | Atherton | H04N 21/242 348/E9.034 |
| 2013/0297815 | A1* | 11/2013 | Ma | H04L 67/62 709/231 |
| 2014/0086446 | A1* | 3/2014 | Han | H04N 9/8042 382/100 |
| 2014/0137139 | A1* | 5/2014 | Jones | H04N 21/4394 725/18 |
| 2014/0214532 | A1* | 7/2014 | Barton | G06Q 30/0251 705/26.62 |
| 2014/0278845 | A1* | 9/2014 | Teiser | H04N 21/812 705/14.4 |
| 2014/0282671 | A1* | 9/2014 | McMillan | H04N 21/44213 725/19 |
| 2015/0052571 | A1* | 2/2015 | Stokking | H04N 21/8547 725/116 |
| 2015/0128180 | A1* | 5/2015 | Mountain | H04N 21/64322 725/39 |

(56) References Cited

U.S. PATENT DOCUMENTS

| | | | |
|---|---|---|---|
| 2015/0229979 A1* | 8/2015 | Wood | H04N 21/4663 725/14 |
| 2015/0237389 A1* | 8/2015 | Grout | H04N 21/2665 725/49 |
| 2015/0312601 A1* | 10/2015 | Novotny | H04N 21/64769 725/117 |
| 2015/0334257 A1* | 11/2015 | Woods | H04N 1/00106 348/207.1 |
| 2016/0057490 A1* | 2/2016 | Besehanic | H04N 21/44213 725/19 |
| 2016/0127793 A1* | 5/2016 | Grout | H04N 21/4668 725/46 |
| 2016/0165287 A1* | 6/2016 | Wood | H04N 21/44222 725/14 |
| 2016/0182973 A1* | 6/2016 | Winograd | H04N 21/8358 725/25 |
| 2016/0323650 A1* | 11/2016 | Grout | H04N 21/26283 |
| 2017/0078727 A1* | 3/2017 | Wood | H04N 21/44222 |
| 2017/0250882 A1* | 8/2017 | Kellicker | H04L 67/535 |
| 2017/0324995 A1* | 11/2017 | Grout | H04N 21/23424 |
| 2018/0020243 A1* | 1/2018 | Ni | G11B 27/28 |
| 2018/0115796 A1* | 4/2018 | Yang | H04L 1/00 |
| 2018/0262805 A1* | 9/2018 | Grout | H04N 21/4532 |
| 2019/0058929 A1* | 2/2019 | Young | H04N 21/235 |
| 2019/0149874 A1* | 5/2019 | Lau | H04N 21/4398 725/74 |
| 2020/0275141 A1* | 8/2020 | Merchant | H04N 21/812 |
| 2020/0275168 A1* | 8/2020 | Merchant | G06F 21/64 |
| 2020/0404366 A1* | 12/2020 | Ropke | H04N 21/44008 |
| 2020/0404367 A1* | 12/2020 | Ropke | H04N 21/812 |

FOREIGN PATENT DOCUMENTS

| | | |
|---|---|---|
| CN | 104754419 A | 7/2015 |
| CN | 106331880 A | 1/2017 |
| CN | 107124664 A | 9/2017 |
| CN | 107995515 A | 5/2018 |
| CN | 108881956 A | 11/2018 |
| CN | 109348252 A | 2/2019 |
| CN | 109600678 A | 4/2019 |
| CN | 110213599 A | 9/2019 |
| CN | 110446115 A | 11/2019 |
| WO | 2017222591 A1 | 12/2017 |

OTHER PUBLICATIONS

China National Intellectual Property Administration (CNIPA) Office Action 1 for 201911285719.3 dated Feb. 28, 2022 9 Pages (including translation).

The World Intellectual Property Organization (WIPO) International Search Report for PCT/CN2020/119903 dated Dec. 30, 2020 6 Pages (including translation).

* cited by examiner

| Interactive timestamp | |
|---|---|
| Interactive information unique ID | Interactive information type |
| Interactive information absolute time | |
| Interactive information priority | Supported App environment |
| Interactive information jump protocol | |
| Checked in-video-frame region | |
| Extension field | |

(1)

(2)

(3)

INTERACTIVE SERVICE PROCESSING METHOD AND SYSTEM, DEVICE, AND STORAGE MEDIUM

RELATED APPLICATIONS

This application is a continuation of PCT/CN2020/119903, filed on Oct. 9, 2020, which in turn claims priority to Chinese Patent Application No. 201911285719.3, entitled "INTERACTIVE SERVICE PROCESSING METHOD, SYSTEM, AND APPARATUS, DEVICE, AND STORAGE MEDIUM," filed on Dec. 13, 2019. The two applications are both incorporated by reference in their entirety.

FIELD OF THE TECHNOLOGY

Embodiments of this application relate to the field of computer technologies, and in particular, to an interactive service processing method and system, a device, and a storage medium.

BACKGROUND OF THE DISCLOSURE

With continued development of Internet technologies, viewing a live broadcast or a video on demand through a player of a terminal gradually becomes an indispensable way to acquire information or enjoy entertainment in people's life. In the process of playing the live broadcast or the video on demand, the terminal can add an interactive activity synchronized with video content by processing an interactive service, to make video viewing more interactive and interesting.

In the related art, during processing of an interactive service, a server embeds interactive data associated with the interactive server in a corresponding video stream fragment, and then transmits the video stream fragment to a terminal. The terminal, after receiving the video stream fragment, processes the interactive service according to the interactive data embedded in the video stream fragment.

However, the interactive data often can only be transmitted to the terminal in a form of being embedded in the corresponding video stream fragment. Data that may be embedded in the video stream fragment is limited in size. This interactive service processing method is thus limited in its application scenarios, and has a poor interactive service processing result.

SUMMARY

The embodiments of this application provide an interactive service processing method and system, a device, and a storage medium, which can be used to improve an interactive service processing effect. The technical solutions are as follows.

One aspect of the present disclosure provides an interactive service processing method, applicable to a target server. The method includes acquiring a video stream and interactive information corresponding to the video stream, the interactive information comprising an interactive timestamp and interactive data; determining a transmission mode corresponding to the interactive information, the transmission mode comprising one of transmission based on a network channel and transmission with a video stream fragment as a medium; transmitting the video stream to a target terminal; and transmitting the interactive information to the target terminal based on the transmission mode corresponding to the interactive information, the target terminal being configured to process interactive service on the video stream according to the interactive timestamp and the interactive data in the interactive information.

Another aspect of the present disclosure provides an interactive service processing method, applicable to a target terminal. The method includes receiving a video stream transmitted by a target server; acquiring interactive information corresponding to the video stream transmitted by the target server, the interactive information comprising an interactive timestamp and interactive data; and processing interactive service on the video stream according to the interactive timestamp and the interactive data in the interactive information. Another aspect of the present disclosure provides an interactive service processing system. The system includes a terminal and a server. The server is configured to acquire a video stream and interactive information corresponding to the video stream, the interactive information comprising an interactive timestamp and interactive data; determine a transmission mode corresponding to the interactive information, the transmission mode corresponding to the interactive information comprising at least one of transmission based on a network channel and transmission with a video stream fragment as a medium; and transmit the video stream to the target terminal. The terminal is configured to receive the video stream transmitted by the server. The server is further configured to transmit the interactive information to the terminal based on the transmission mode corresponding to the interactive information. The terminal is further configured to acquire the interactive information corresponding to the video stream transmitted by the server; and process interactive service on the video stream according to the interactive timestamp and the interactive data in the interactive information.

In embodiments of the present disclosure, the target server transmits the interactive information to the target terminal based on one or more transmission modes corresponding to the interactive information. The target terminal processes interactive service on the video stream according to the interactive timestamp and the interactive data in the interactive information. The interactive information includes an interactive timestamp and interactive data. The setting of the interactive timestamp enables the interactive information to be transmitted to the target terminal in one or more transmission modes, which increases an arrival rate of the interactive information and expands application scenarios of the interactive service processing, thereby improving the results of interactive service processing.

BRIEF DESCRIPTION OF THE DRAWINGS

To describe the technical solutions in the embodiments of this application more clearly, the accompanying drawings required for describing the embodiments are briefly described hereinafter. Apparently, the accompanying drawings in the following descriptions show merely some embodiments of this application, and a person of ordinary skill in the art may obtain other accompanying drawings according to these accompanying drawings without creative efforts.

DESCRIPTION OF EMBODIMENTS

Figure 1:
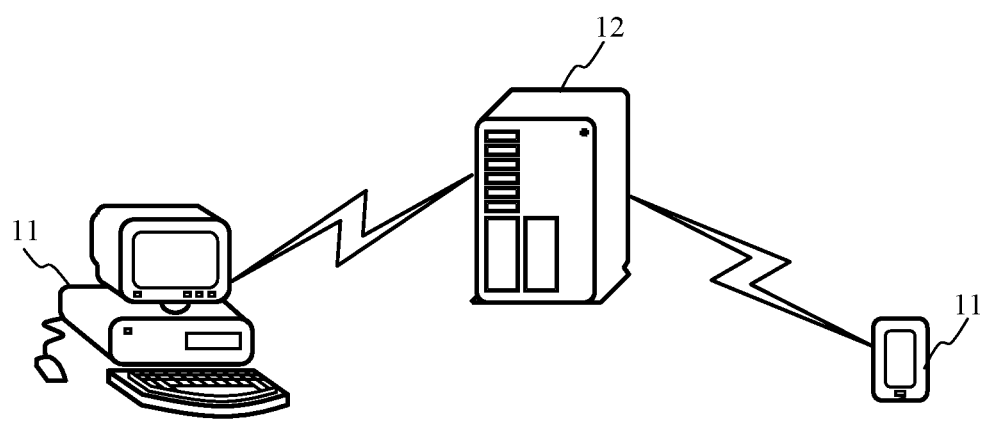
FIG. 1 is a schematic diagram of an implementation environment of an interactive service processing method according to an embodiment of this application.

To make objectives, technical solutions, and advantages of this application clearer, the following further describes implementations of this application in detail with reference to the accompanying drawings.

First, several terms included in this application are explained.

"Timestamp" refers to a piece of complete and verifiable data that can represent the existence of a piece of data prior to a particular time, which is generally a sequence of characters that uniquely identifies a moment in time.

"Live broadcast" means that video content is recorded in real time, and during the real-time recording, audio and video are pushed to a server in a form of a media "stream". Once a viewer views the live broadcast, the server receives a response and transmits the media stream to a player to realize video playing.

"Video on demand" means that video content is recorded in advance and has been stored on the server. Once the viewer views the video on demand, the server receives a response and transmits a media stream to the player to realize video playing. Users can adjust a play progress such as fast forward during the viewing of the video on demand.

"Moving Picture Experts Group Audio Layer 3 Uniform Resource Locator (M3U) file" records an indexed plain text file. When the M3U file is opened, player software does not play the M3U file, but finds a network address of a corresponding audio and video file according to an index of the M3U file, and then plays the audio and video file online according to the found network address.

"M3U8 file" refers to an M3U file in a Unicode TransformationFormat-8 bit (UTF-8) encoding format. The M3U8 file is a common streaming media format, and exists mainly in a form of a file list, which supports both live broadcast and video on demand, especially common on platforms such as Android and iOS (Apple's mobile operating system).

"HTTP Live Streaming (HLS)" is a HyperText Transfer Protocol (HTTP)-based streaming media transfer protocol and can realize live broadcast and video on demand of a streaming media. The working principle of the HLS is to split a whole stream into small HTTP-based files for download and download only a few files at a time. When a streaming session is started, a client may download an M3U8 file including metadata. Since the M3U8 file supports both live broadcast and video on demand, live broadcast and video on demand of a streaming media can be realized.

"Long connection" means transmitting and receiving a plurality of HTTP requests/responses in the same Transmission Control Protocol (TCP) connection.

"Short connection" means establishing a connection each time the client and the server perform an HTTP request/response operation and interrupting the connection at the end of a task.

"Segment tree" is a binary search tree. Similar to an interval tree, the segment tree divides an interval into some unit intervals. Each unit interval corresponds to a leaf node in the segment tree. The number of occurrences of a node in a plurality of line segments can be quickly found by using the segment tree. Time complexity is O(log N).

An embodiment of this application provides an interactive service processing method. Referring to FIG. 1, FIG. 1 is a schematic diagram of an implementation environment of an interactive service processing method according to an embodiment of this application. The implementation environment includes a terminal 11 and a server 12.

An application or a web page that can play a video stream is installed in the terminal 11. During the playing of the video stream by the application or the web page, the terminal 11 can process interactive service by using the method according to the embodiments of this application. The server 12 can acquire the video stream and interactive information corresponding to the video stream, and then transmit the video stream and the interactive information to the terminal 11. The terminal 11 can receive the video stream and the interactive information that are transmitted by the server 12, and then process interactive service on the video stream based on an interactive timestamp and interactive data in the interactive information.

For example, "the terminal 11 receives the video stream and the interactive information that are transmitted by the server 12, and then processes interactive service on the video stream based on an interactive timestamp and interactive data in the interactive information" means in the process of playing the video stream, determining, in the interactive information, target interactive information corresponding to a target played video frame that is currently being played according to the interactive timestamp in the interactive information, and processing interactive service on the target played video frame according to target interactive data in the target interactive information.

In one embodiment, the terminal 11 is an electronic product capable of human-computer interaction with a user in one or more ways, such as through a keyboard, a touchpad, a touch screen, a remote control, voice interaction or a handwriting device. The electronic product is, for example, a Personal Computer (PC), a mobile phone, a smartphone, a Personal Digital Assistant (PDA), a wearable device, a Pocket PC (PPC), a tablet computer, a smart in-vehicle infotainment, a smart television, a smart speaker, or the like. The server 12 is one server or a server cluster formed by a plurality of servers, or a cloud computing service center. The terminal 11 establishes a communication connection with the server 12 via a wired or wireless network.

It would be appreciated by a person skilled in the art that the terminal 11 and the server 12 are only examples. If other existing or future possible terminals or servers are applicable to this application, such terminals or servers also fall within the protection scope of this application, and are incorporated herein by reference.

Figure 2:
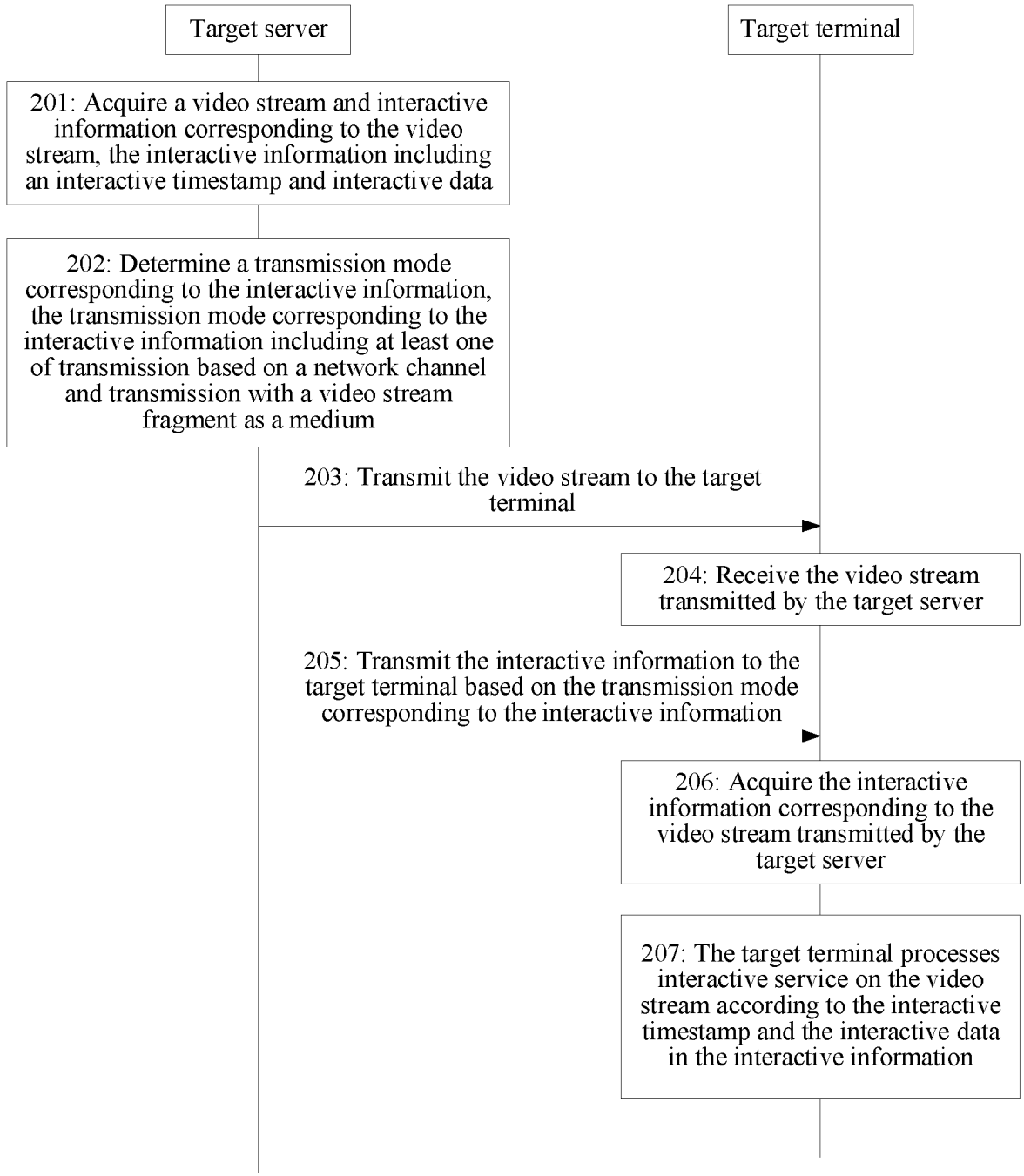
FIG. 2 is a flowchart of an interactive service processing method according to an embodiment of this application.

Based on the implementation environment shown in FIG. 1, an embodiment of this application provides an interactive service processing method. In an example, the method is applied to a process of interaction between a target terminal and a target server, the target terminal is the terminal 11 in FIG. 1, and the target server is the server 12 in FIG. 1. As shown in FIG. 2, the interactive service processing method according to the embodiments of this application includes the following steps:

In step 201, the target server acquires a video stream and interactive information corresponding to the video stream. The interactive information includes an interactive timestamp and interactive data.

The video stream refers to any video stream needing to be played by the target terminal in the embodiments of this application. The interactive information corresponding to the video stream refers to interactive information required during the interactive service processing when the target terminal plays the video stream. For example, the interactive service processing refers to performing an action indicated by the interactive data in the interactive information. For example, when the action indicated by the interactive data in the interactive information is to pop up an advertising box, the process of the interactive service processing is to pop up the advertising box in the played video frame. The video stream may correspond to one or more pieces of interactive information, which is not limited in the embodiments of this application.

The interactive information corresponding to the video stream includes the interactive timestamp and the interactive data. The interactive timestamp is a timestamp of a reference encoded video frame, and the reference encoded video frame is an encoded video frame corresponding to the interactive information in the video stream. The video stream in the embodiments of this application writes a timestamp for each encoded video frame during encoding. That is, each encoded video frame in the video stream has a timestamp. The timestamp of the encoded video frame is configured to position the encoded video frame in the video stream. In an exemplary embodiment, if video pictures of consecutive encoded video frames are the same, the timestamps under the same video picture are the same. The reference encoded video frame is an encoded video frame corresponding to the interactive information in the video stream. The timestamp of the reference encoded video frame is used as an interactive timestamp in the interactive information corresponding to the video stream.

When the video stream corresponds to a plurality of pieces of interactive information, each piece of interactive information includes an interactive timestamp and interactive data. The interactive timestamps included in different interactive information may be the same or different, which is not limited in the embodiments of this application. For any two pieces of interactive information including the same interactive timestamp, the interactive data included in the two pieces of interactive information is different. For any two pieces of interactive information including different interactive timestamps, the interactive data included in the two pieces of interactive information may be the same or different.

For example, any piece of interactive information includes an interactive timestamp and interactive data. The interactive timestamp is configured to calibrate video frames in the video stream to ensure real-time interaction of the target terminal. The interactive data can ensure scalability of formats of the interactive information while supporting application scenarios.

Figures 3, 4:
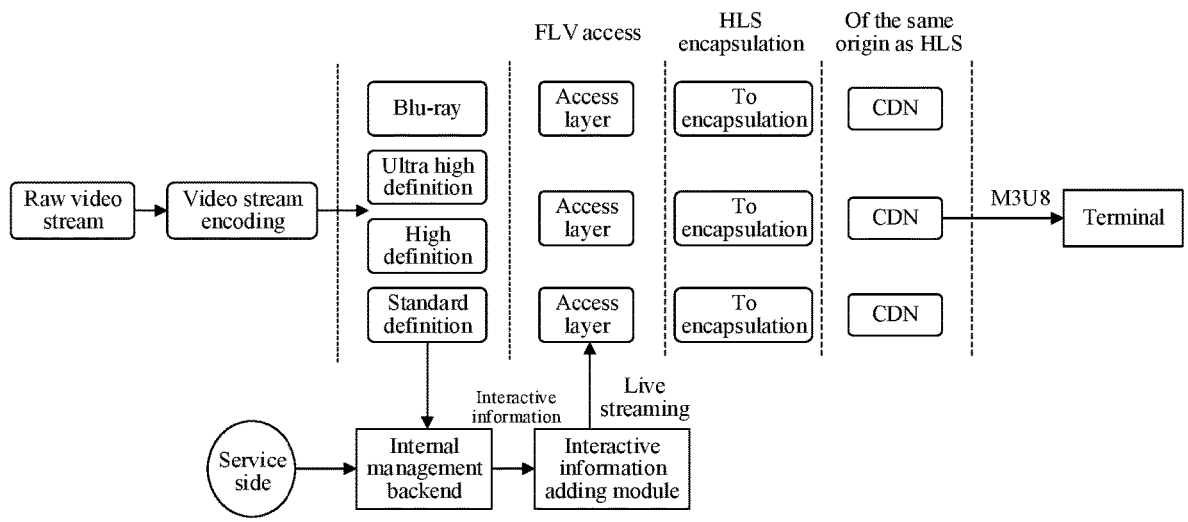
FIG. 3 is a schematic diagram of a format of interactive information according to an embodiment of this application.
FIG. 4 is a diagram of a basic process of accessing and outputting a video stream according to an embodiment of this application.

For example, in a format of the interactive information shown in FIG. 3, the interactive data in the interactive information is formed by an interactive information unique Identity Document (ID), interactive information absolute time (time generated by the interactive information), an interactive information type, an interactive information priority, an Application (App) environment supported by the interactive information, an interactive information jump protocol, a checked in-video-frame region and an extension field.

The interactive information unique ID and the interactive information absolute time are configured to uniquely identify a piece of interactive information to facilitate positioning, statistics and the like. The interactive information type is configured to distinguish different actions. The interactive information priority is configured to determine an order in which actions indicated by the interactive data in different interactive information are performed at the same time. The App environment supported by the interactive information is applied mainly to multi-App environment scenarios. The App environment includes, but is not limited to, a development environment, a test environment, a grayscale environment, and a formal environment. The interactive information jump protocol is applied mainly to real-time jump scenarios, and implements, according to a configured jump address, a function of causing a node in the video stream to jump to a HyperText Markup Language 5 (HTML5) page or displaying an HTML5 page. The checked in-video-frame region is applied mainly to customization requirements for a specified region in the video stream played by the target terminal. In addition, the target interactive data further adds the extension field outside an application mode to support more application scenarios and changing product requirements.

The target server acquires the video stream in different ways according to different playing forms of the video stream. The method in which the target server acquires the video stream is not limited in the embodiments of this application. For example, when the video stream is played by live broadcast, the target server acquires the video stream in real time from a live broadcast terminal. When the video stream is played by on demand, the target server acquires the video stream by extracting the video stream from stored video streams.

The target server acquires the interactive information corresponding to the video stream in different methods according to different methods in which the target server acquires the video stream. The method in which the target server acquires the interactive information corresponding to the video stream is not limited in the embodiments of this application. For example, when the target server acquires the video stream in real time from the live broadcast terminal, the target server acquires the interactive information corresponding to the video stream in real time. When the target server acquires the video stream by extracting the video stream from the stored video streams, the target server acquires the interactive information corresponding to the video stream by extracting the interactive information from the storage. Certainly, according to different actual application scenarios, the target server also acquires the interactive information corresponding to the video stream by first acquiring part of the interactive information from the storage and then acquiring the rest of the interactive information in real time.

In one embodiment, the process of acquiring, by the target server, a video stream and interactive information corresponding to the video stream involves: acquiring, by the target terminal, a playing request for the video stream, and transmitting the playing request for the video stream to the target server; receiving, by the target server, the playing request for the video stream transmitted by the target terminal; and acquiring, by the target server based on the playing request for the video stream, the video stream and the interactive information corresponding to the video stream. The playing request includes identification information of the video stream. The target server may determine the video stream according to the identification information of the video stream in the playing request, to further acquire the video stream and the interactive information corresponding to the video stream. For example, the target terminal acquires the playing request for the video stream in the following method: acquiring, by the target terminal, the playing request for the video stream in response to a trigger instruction for a video icon corresponding to the video stream.

In one embodiment, the target server has a first interface and a second interface. The first interface is configured to acquire information generated by an internal management backend. The second interface is configured to acquire information that is not generated by the internal management backend. That is, in addition to providing the internal management backend with an interface to transmit information, the target server also provides other external service management backends except the internal management backend with the interface to transmit information. The internal management backend refers to a management backend of a service side corresponding to the target server.

In one embodiment, the target server acquires the interactive information corresponding to the video stream in the following three methods:

In a first method, first interactive information corresponding to the video stream is acquired based on the first interface. The first interactive information is interactive information generated by the internal management backend.

In the first method, the interactive information corresponding to the video stream is all the interactive information generated by the internal management backend.

In a second method, second interactive information corresponding to the video stream is acquired based on the second interface. The second interactive information is interactive information that is that is not generated by the internal management backend.

In the second method, the interactive information corresponding to the video stream is all the interactive information that is that is not generated by the internal management backend.

In a third method, first interactive information corresponding to the video stream is acquired based on the first interface; and second interactive information corresponding to the video stream is acquired based on the second interface.

In the third method, the first interactive information and the second interactive information are used as the interactive information corresponding to the video stream. The first interactive information is the interactive information generated by the internal management backend, and the second interactive information is the interactive information that is that is not generated by the internal management backend. Therefore, in the third method, the interactive information corresponding to the video stream includes the interactive information generated by the internal management backend as well as the interactive information that is that is not generated by the internal management backend. In this way, customized configuration of the internal management backend as well as a plurality of interaction requirements under multiple scenarios and multiple services can be met.

In step 202, the target server determines a transmission mode corresponding to the interactive information. The transmission mode corresponding to the interactive information includes at least one of transmission based on a network channel and transmission with a video stream fragment as a medium.

After acquiring the interactive information corresponding to the video stream, the target server determines the transmission mode corresponding to the interactive information. In one embodiment, the transmission mode corresponding to the interactive information corresponding to the video stream includes the following three cases:

In a first case, the transmission mode corresponding to the interactive information corresponding to the video stream is transmission based on a network channel.

In a second case, the transmission mode corresponding to the interactive information corresponding to the video stream is transmission with a video stream fragment as a medium.

In the process of transmission with a video stream fragment as a medium, a start timestamp in the video stream fragment as the medium is no later than the interactive timestamp in the interactive information corresponding to the video stream, to prevent impossible execution of an action indicated by the interactive data in the interactive information corresponding to the video stream.

In a third case, the transmission mode corresponding to the interactive information corresponding to the video stream is transmission based on a network channel and transmission with a video stream fragment as a medium. That is, the interactive information corresponding to the video stream can correspond to two transmission modes at the same time.

In one embodiment, the interactive information corresponding to the video stream carries data configured to represent a transmission mode, and the target server can parse the data configured to represent the transmission mode and carried in the interactive information corresponding to the video stream to determine the transmission mode corresponding to the interactive information.

In another embodiment, the process of determining, by the target server, a transmission mode corresponding to the interactive information corresponding to the video stream involves: querying, by the target server, a correspondence between interactive data and transmission modes for a transmission mode corresponding to the interactive data in the interactive information corresponding to the video stream, and taking the transmission mode corresponding to the interactive data in the interactive information corresponding to the video stream as the transmission mode corresponding to the interactive information. The correspondence between interactive data and transmission modes can be stored in the target server. The process of acquiring the correspondence between interactive data and transmission modes is not limited in the embodiments of this application. The correspondence between interactive data and transmission modes can be set by a developer according to a type of the interactive data, an application scenario of the interactive data, a source of the interactive data and the like, and then the developer uploads the correspondence between interactive data and transmission modes to the target server through a development terminal.

In an exemplary embodiment, the internal management backend can easily acquire the timestamp of the encoded video frame in the video stream by operating against the video stream. Therefore, the transmission mode corresponding to the interactive information generated by the internal management backend may be transmission based on a network channel, or transmission with a video stream fragment as a medium, or transmission based on a network channel and transmission with a video stream fragment as a medium. In an exemplary embodiment, the transmission mode corresponding to the interactive information that is that is not generated by the internal management backend is transmission with a video stream fragment as a medium. In an exemplary embodiment, a transmission mode corresponding to interactive information of a video-on-demand application scenario is transmission with a video stream fragment as a medium.

In one embodiment, in a case that the video stream corresponds to a plurality of pieces of interactive information, transmission modes respectively corresponding to the plurality of pieces of interactive information are determined. The transmission modes corresponding to different interactive information may be the same or different, which is not limited in the embodiments of this application.

In one embodiment, after the transmission modes respectively corresponding to the plurality of pieces of interactive information are determined, the plurality of pieces of interactive information are aggregated based on the transmission modes respectively corresponding to the plurality of pieces of interactive information. Aggregation means grouping a plurality of pieces of interactive information corresponding to the same transmission mode, so that the grouped interactive information is subsequently transmitted to the target terminal in batches.

For example, the process of aggregation involves: for a plurality of pieces of interactive information corresponding to the transmission mode including transmission based on a network channel, classifying the plurality of pieces of interactive information into a first reference number of interactive information groups according to data such as current service loads, bandwidths, a length of each piece of interactive information, and interactive timestamps in the interactive information. The specific classification process and the first reference number are not limited in the embodiments of this application, which can be flexibly adjusted according to an actual application scenario. In an exemplary case, if supported by the data such as the current service loads and the bandwidths, the first reference number can be set to 1. That is, the plurality of pieces of interactive information corresponding to the transmission mode of transmission based on a network channel are all classified into one interactive information group. For example, after the plurality of pieces of interactive information corresponding to the transmission mode including transmission based on a network channel are classified into the first reference number of interactive information groups whatever the first reference number is, the interactive information in one interactive information group can be transmitted at a time in the subsequent process of transmission based on a network channel. This helps improve transmission efficiency of the interactive information.

For example, the process of aggregation involves: for a plurality of pieces of interactive information corresponding to the transmission mode including transmission with a video stream fragment as a medium, classifying the plurality of pieces of interactive information into a second reference number of interactive information groups according to data such as a length of information supported and carried by each video stream fragment, a length of each piece of interactive information and interactive timestamps in the interactive information. Interactive information in each interactive information group is transmitted through a same video stream fragment. In an exemplary case, if an overall length of the plurality of pieces of interactive information corresponding to the transmission mode including transmission with a video stream fragment as a medium is no greater than the length of information supported and carried by each video stream fragment, the second reference number is set to 1. That is, the plurality of pieces of interactive information corresponding to the transmission mode including transmission with a video stream fragment as a medium are all classified into one interactive information group. For example, after the plurality of pieces of interactive information corresponding to the transmission mode including transmission with a video stream fragment as a medium are classified into the second reference number of interactive information groups whatever the second reference number is, the interactive information in one interactive information group can be transmitted with the same video stream fragment as a medium at a time in the subsequent process of transmission with the video stream fragment as a medium. This helps improve transmission efficiency of the interactive information.

In one embodiment, one piece of interactive information can be split. Splitting means splitting the piece of interactive information into a plurality of pieces of interactive sub-information. For example, such processing is aimed at interactive information needing to be transmitted with a video stream fragment as a medium. When a length of one piece of interactive information is greater than the length of information supported and carried by one video stream fragment, the piece of interactive information is split into a plurality of pieces of interactive sub-information, to subsequently transmit different interactive sub-information with different video stream fragments as mediums. Start timestamps of the plurality of video stream fragments as mediums are no later than the interactive timestamp in the interactive information.

In step 203, the target server transmits the video stream to the target terminal.

In one embodiment, the target server transmits the video stream to the target terminal in the following method: equally dividing, by the target server, the video stream into a plurality of video stream fragments arranged in sequence, and gradually transmitting the video stream fragments to the target terminal according to the arrangement sequence. In an exemplary embodiment, in the process of transmitting the video stream fragments according to the arrangement sequence, a transmission interval between two adjacent video stream fragments is set according to time lengths of the video stream fragments. For example, assuming that the time lengths of the video stream fragments are all 5 s, the transmission interval between two adjacent video stream fragments is set to 3 s. That is, after the previous video stream fragment is transmitted to the target terminal, the following video stream fragment adjacent thereto is transmitted to the target terminal at an interval of 3 s, so that the target terminal plays the video stream fragments without interruption.

After equally dividing the video stream into a plurality of video stream fragments, the target server can also process part or all of the video stream fragments to enable the video stream fragments to carry interactive information, and then transmit the video stream fragments to the target terminal.

In an exemplary embodiment, a basic process of accessing and outputting a video stream is shown in FIG. 4. A native video streams (i.e., raw video stream) is encoded by software and hardware to generate a plurality of video streams in different definition (such as Blu-ray, ultra high definition, high definition, and standard definition). The same encoded video frame in the plurality of video streams with different definition has the same timestamp, to lay a foundation for interactive service processing by terminals. The internal management backend of the service side can add, through an interactive information adding module, interactive information to the video stream by live streaming in a FlashVideo (FVL, a video encoding format) access layer, and after HLS encapsulation, write the interactive information into the M3U8 file in the form of a private label for use by terminals in each scenario. The M3U8 file received by the terminals is transmitted through a Content Delivery Network (CDN) of the same origin as HLS. The internal management backend can get the video stream about 20s in advance, which is convenient for operation personnel to operate in the management backend.

In step 204, the target terminal receives the video stream transmitted by the target server.

After the target server transmits the video stream to the target terminal, the target terminal can receive the video stream transmitted by the target server. In one embodiment, in a case that the target server equally divides the video stream into a plurality of video stream fragments arranged in sequence, the target terminal can continuously receive adjacent video stream fragments transmitted by the target server. After receiving the video stream fragments, the target terminal may gradually play the video stream according to the adjacent video stream fragments. In the process of playing the video stream, each played video frame corresponds to one timestamp. The timestamp of each played video frame is consistent with the timestamp of the corresponding encoded video frame.

In step 205, the target server transmits the interactive information to the target terminal based on the transmission mode corresponding to the interactive information.

The interactive information is transmitted to the target terminal, so that the target terminal can process, in the process of playing the video stream, interactive service according to the interactive data in the interactive information, to realize real-time interaction of the target terminal. The interactive information has an interactive timestamp. Therefore, the embodiments of this application support delivery of the interactive information in advance to reduce network overheads prior to execution of the action indicated by the interactive data in the interactive information and reduce a latency in real-time synchronization.

In one embodiment, according to different transmission modes corresponding to the interactive information, the target server transmits the interactive information to the target terminal in the following three methods:

In a first method, in response to the transmission mode corresponding to the interactive information being transmission based on a network channel, the interactive information is transmitted to the target terminal through a network channel established between the target server and the target terminal.

The network channel established between the target server and the target terminal is a long-connection channel or a short-connection channel, which is not limited in the embodiments of this application. When the network channel established between the target server and the target terminal is the long-connection channel, the target server can actively transmit the interactive information to the target terminal. When the network channel established between the target server and the target terminal is the short-connection channel, the target server can transmit the interactive information to the target terminal based on a polling request of the target terminal.

In a second method, in response to the transmission mode corresponding to the interactive information being transmission with a video stream fragment as a medium, the interactive information along with a reference video stream fragment is transmitted to the target terminal.

The reference video stream fragment is a video stream fragment serving as a transmission medium of the interactive information. A start timestamp of the reference video stream fragment is no later than the interactive timestamp in the interactive information.

In one embodiment, the target server transmits the interactive information along with a reference video stream fragment to the target terminal in the following method: acquiring, by the target server, a streaming media file corresponding to the reference video stream fragment, and adding the interactive information to the streaming media file in a form of a private label to obtain a target streaming media file; and transmitting the target streaming media file to the target terminal. Since the private label in the target streaming media file carries the interactive information, the interactive information can be transmitted to the target terminal by transmitting the target streaming media file to the target terminal. The private label in the streaming media file is encoded and decoded in a known scheme. Therefore, with this scheme, the target terminal, after receiving the target streaming media file, can parse the private label in the target streaming media file according to the known encoding and decoding scheme, to obtain the interactive information.

For example, the streaming media file corresponding to the reference video stream fragment refers to an M3U8 file. The M3U8 file supports addition of the private label. In the embodiments of this application, the interactive information is added to the M3U8 file in the form of the private label, so that the interactive information can be transmitted to the target terminal along with the M3U8 file.

In another embodiment, the interactive information can also be transmitted along with the video stream fragment to the target terminal in other forms, provided that an encoding and decoding scheme for the form of the interactive information is known, which is not limited in the embodiments of this application. For example, the interactive information can be transmitted along with the video stream fragment to the target terminal in a form of a data stream. An encoding and decoding scheme for the data stream can be transmitted from the target server to the target terminal, so that the target terminal parses the data stream according to the encoding and decoding scheme for the data stream to obtain the interactive information.

In a third method, when the transmission mode corresponding to the interactive information is transmission based on a network channel and transmission with a video stream fragment as a medium, the interactive information is transmitted to the target terminal through a network channel established between the target server and the target terminal, and the interactive information is transmitted to the target terminal along with the reference video stream fragment.

When the interactive information corresponds to the two transmission modes of transmission based on a network channel and transmission with a video stream fragment as a medium, the interactive information is transmitted to the target terminal twice in the two transmission modes. In this way, the failure to receive the interactive information due to a transmission fault can be reduced, and an arrival rate of the interactive information can be increased.

In an exemplary embodiment, in a case that a plurality of pieces of interactive information are provided, the target server can aggregate the plurality of pieces of interactive information based on the transmission modes respectively corresponding to the plurality of pieces of interactive information and then transmit the plurality of pieces of aggregated interactive information to the target terminal. For a plurality of pieces of aggregated interactive information in the same transmission mode, the plurality of pieces of interactive information in each interactive information group can be simultaneously transmitted according to a grouping situation. For example, for a plurality of pieces of interactive information corresponding to the transmission mode including transmission based on a network channel, the plurality of pieces of interactive information in one interactive information group can be simultaneously transmitted to the target terminal at a time. For a plurality of pieces of interactive information corresponding to the transmission mode including transmission with a video stream fragment as a medium, when one video stream fragment is transmitted, the plurality of pieces of interactive information in one interactive information group with the video stream fragment as a transmission medium can be transmitted to the target terminal along with the video stream fragment.

In an exemplary embodiment, a piece of split interactive information can be divided into a plurality of pieces of interactive sub-information, and the plurality of pieces of interactive sub-information are transmitted to the target terminal along with a plurality of video stream fragments.

Figure 5:
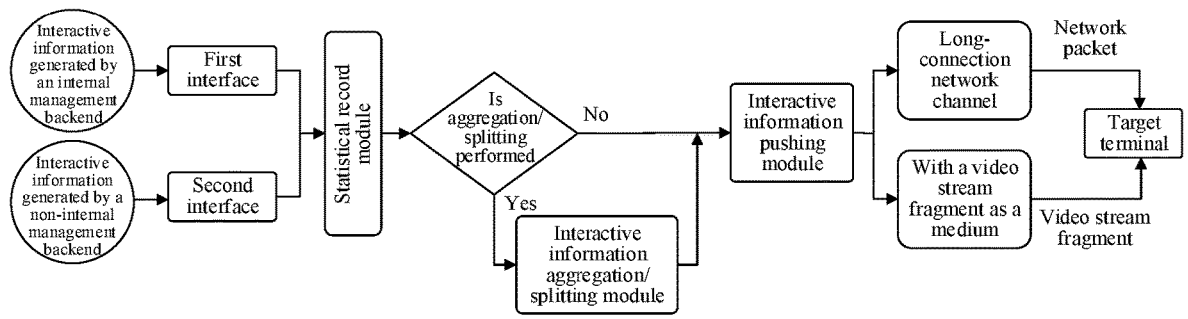
FIG. 5 is a schematic diagram of a process of transmitting, by a target server, interactive information to a target terminal according to an embodiment of this application.

For example, the process of transmitting, by the server, the interactive information to the target terminal is shown in FIG. 5. The interactive information generated by the internal management backend and the interactive information that is that is not generated by the internal management backend may be transmitted to a statistical record module respectively through the first interface and the second interface. The statistical record module may determine, according to a current service load and a message length, whether the interactive information needs to be aggregated/split while locally storing the interactive information by using a segment-tree structure. When it is determined that the interactive information needs to be aggregated/split, the interactive information is aggregated/split by an interactive information aggregation/splitting module, and then the processed interactive information is transmitted to an interactive information pushing module. When it is determined that the interactive information does not need to be aggregated/split, the interactive information is directly transmitted to the interactive information pushing module. According to different transmission modes corresponding to the interactive information, the interactive information pushing module may selectively transmit the interactive information to the target terminal in a form of a network packet through a long-connection network channel, or transmit the interactive information to the target terminal along with a video stream fragment with the video stream fragment as a medium, or transmit the interactive information to the target terminal in a form of a network packet through a long-connection network channel and transmit the interactive information to the target terminal along with a video stream fragment with the video stream fragment as a medium.

In one embodiment, the target server further provides a third interface. The third interface is configured to receive a historical interactive information acquisition request transmitted by the target terminal. The target server can receive, based on the third interface, the historical interactive information acquisition request transmitted by the target terminal; acquire, based on the historical interactive information acquisition request, historical interactive information corresponding to the video stream; and transmit the historical interactive information to the target terminal. In one embodiment, the target server acquires historical interactive information corresponding to the video stream in the following method: extracting, by the target server, the historical interactive information corresponding to the video stream from a database.

The historical interactive information refers to interactive information associated with the video stream on which interactive service has been processed before the target terminal plays the video stream. For example, when the video stream is a live video stream 30 minutes after a live broadcast begins, interactive service has been processed before the target terminal plays the video stream, and the interactive information associated with the video stream refers to interactive information having an interactive timestamp within 30 minutes before the live broadcast begins. For example, an action indicated by interactive data in the interactive information within 30 minutes before the live broadcast begins includes dotting a specified position on a progress bar 30 minutes before the live broadcast begins and displaying an important event label.

In an exemplary embodiment, in some scenarios where the target terminal requires secondary confirmation, the target server is also required to acquire the historical interactive information corresponding to the video stream. For example, in the case of a need to confirm whether a red packet rain has occurred, the target server is required to acquire the historical interactive information and then transmit the historical interactive information to the target terminal. The target terminal confirms, according to the historical interactive information, whether a red-packet-rain interactive service is needed.

Whether the server acquires the historical interactive information corresponding to the video stream depends on a requirement of the target terminal. Whether the historical interactive information needs to be acquired is not limited in the embodiments of this application. In an exemplary embodiment, the historical interactive information can be acquired according to a time interval in the process of acquiring the historical interactive information. The time interval can be determined according to an actual application scenario.

Figure 6:
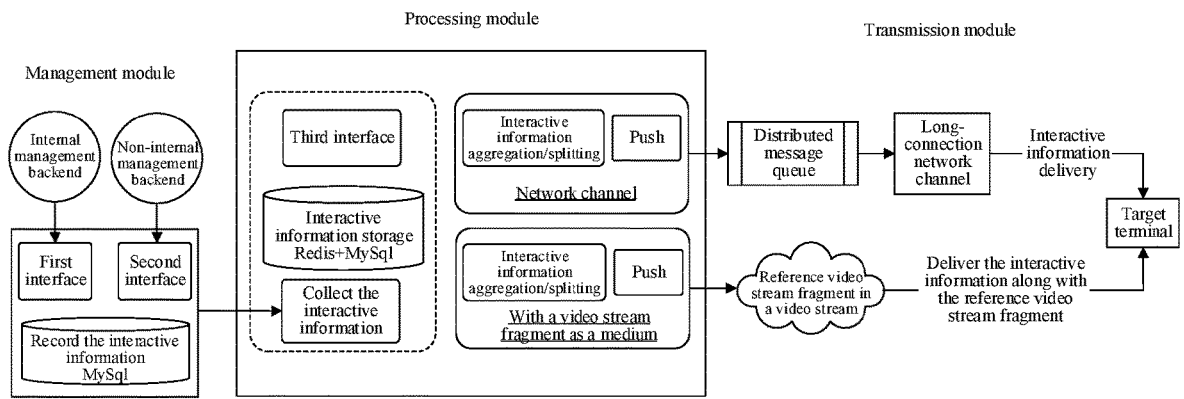
FIG. 6 is a schematic diagram of a process of transmitting, by a target server, interactive information to a target terminal according to an embodiment of this application.

For example, the process of transmitting, by the target server, the interactive information to the target terminal is shown in FIG. 6. The target server is divided into a management module, a processing module, and a transmission module according to different functions. The management module also provides a service for external service call while providing an interface for the internal management backend. The management module can acquire, based on the first interface, the interactive information generated by the internal management backend, acquire, based on the second interface, the interactive information that is that is not generated by the internal management backend, and then record the acquired interactive information in a relational database management system (MySql). The processing module is configured to collect the interactive information corresponding to the video stream from the management module, and store the interactive information in a form of Redis+MySql; and then determine a transmission mode corresponding to the interactive information, respectively aggregate/split interactive information corresponding to the transmission mode including transmission based on a network channel and interactive information corresponding to the transmission mode including transmission with a video stream fragment as a medium, and then push the processed interactive information to the transmission module. In addition, a third interface is further provided in the processing module. The third interface is configured to receive a historical interactive information acquisition request transmitted by the target terminal. The processing module is further capable of pulling, based on the historical interactive information acquisition request, the historical interactive information corresponding to the video stream according to the time interval.

The transmission module is configured to transmit the processed interactive information to the target terminal according to the transmission mode corresponding to the interactive information. For the interactive information corresponding to the transmission mode including transmission based on a network channel, the transmission module first places the interactive information in a distributed message queue, and then delivers the interactive information to the target terminal in batches through the long-connection network channel according to a processing result. For the interactive information corresponding to the transmission mode including transmission with a video stream fragment as a medium, a reference video stream fragment serving as a transmission medium is selected from video stream fragments of the video stream, and then the interactive information is delivered to the target terminal along with the reference video stream fragment.

In step 206, the target terminal acquires the interactive information corresponding to the video stream transmitted by the target server.

According to different methods in which the target server transmits the interactive information corresponding to the video stream to the target terminal, the target terminal acquires the interactive information transmitted by the target server in the following three methods:

In a first method, when the target server transmits the interactive information to the target terminal through a network channel established between the target server and the target terminal, the target terminal acquires the interactive information transmitted by the target server through the network channel established between the target terminal and the target server.

In the first method, when the network channel established between the target server and the target terminal is a long-connection channel, the target terminal can passively receive the interactive information transmitted by the target server. When the network channel established between the target server and the target terminal is a short-connection channel, the target terminal can actively receive the interactive information transmitted by the target server by sending a polling request.

In a second method, when the target server transmits the interactive information to the target terminal along with the reference video stream fragment, the target terminal acquires the interactive information transmitted by the target server along with the reference video stream fragment.

In one embodiment, the process of transmitting, by the target server, the interactive information along with the reference video stream fragment to the target terminal involves: adding, by the target server, the interactive information in a form of a private label to a streaming media file corresponding to the reference video stream fragment, and then transmitting an obtained target streaming media file to the target terminal. In this case, the process of acquiring, by the target terminal, the interactive information transmitted by the target server along with the reference video stream fragment involves receiving, by the target terminal, the target streaming media file transmitted by the target server; and parsing the private label in the target streaming media file to obtain the interactive information. For example, the process of parsing, by the target terminal, the private label in the target streaming media file involves parsing, by the target terminal, the private label in the target streaming media file according to an encoding and decoding scheme corresponding to the private label.

In a third method, when the target server respectively transmits the interactive information to the target terminal through a network channel established between the target server and the target terminal and transmits the interactive information to the target terminal along with the reference video stream fragment, the target terminal respectively acquires the interactive information transmitted by the target server through the network channel established between the target terminal and the target server and acquires the interactive information transmitted by the target server along with the reference video stream fragment.

In one embodiment, when the target server transmits a plurality of pieces of interactive information to the target terminal in the same batch, the target terminal can receive the plurality of pieces of interactive information at the same time. When the target server splits one piece of interactive information into a plurality of pieces of interactive sub-information and transmits such interactive sub-information to the target terminal in batches, the target terminal obtains the interactive information after receiving the plurality of pieces of interactive sub-information in batches.

In one embodiment, in the case of a need to acquire historical interactive information, the target terminal can call the third interface of the target server to transmit a historical interactive information acquisition request to the target server. Then, the target terminal can receive historical interactive information corresponding to the video stream transmitted by the target server; and process interactive service according to historical interactive data in the historical interactive information. For example, "process interactive service according to historical interactive data in the historical interactive information" means performing an action indicated by the historical interactive data in the historical interactive information. Whether the target terminal needs to acquire the historical interactive information can be determined according to a specific scenario of the video stream played by the target terminal, which is not limited in the embodiments of this application.

Figure 7:
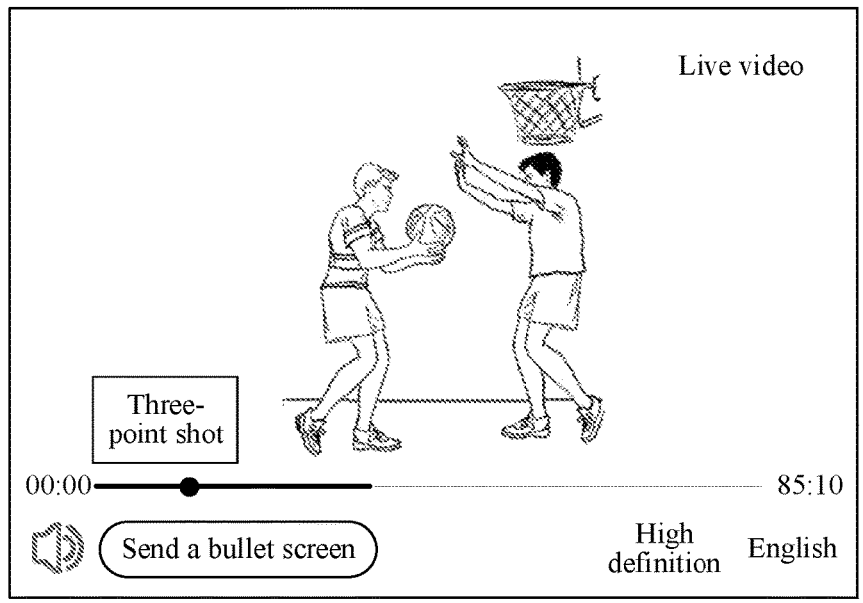
FIG. 7 is a schematic diagram of an interactive service processing result according to an embodiment of this application.

For example, assuming that the action indicated by the historical interactive data is dotting a specified position on a progress bar 30 minutes before the live broadcast begins and displaying an important event label, an interactive service processing result shown in FIG. 7 can be obtained after interactive service is processed according to the historical interactive data. In FIG. 7, a dotting position is displayed on the progress bar. An important event label corresponding to the dotting position is "three-point shot". During viewing of a live broadcast, a user can quickly view video content corresponding to an important event label by dragging the progress bar to a position corresponding to the important event label.

Figure 8:
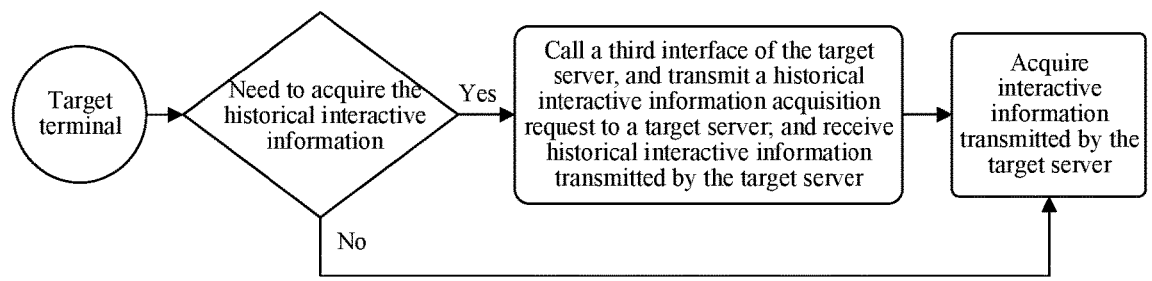
FIG. 8 is a schematic diagram of a process of acquiring, by a target terminal, interactive information according to an embodiment of this application.

For example, the process of acquiring, by the target terminal, the interactive information is shown in FIG. 8. After entering a scenario of playing a video stream, the target terminal first determines whether historical interactive information needs to be acquired. When determining that the historical interactive information needs to be acquired, the target terminal calls the third interface of the target server to transmit a historical interactive information acquisition request to the target server, receives historical interactive information corresponding to the video stream transmitted by the target server, and then acquires the interactive information transmitted by the target server in at least one of the transmission modes of transmission based on a network channel and transmission along with a video stream fragment. When determining that the historical interactive information does not need to be acquired, the target terminal acquires the interactive information transmitted by the target server in at least one of the transmission modes of transmission based on a network channel and transmission along with a video stream fragment.

In one embodiment, the target terminal, after acquiring the interactive information transmitted by the target server, stores the interactive information in a segment-tree structure, to facilitate rapid query and comparison of the interactive information in the process of playing the video stream. According to different methods of acquiring the interactive information, the process of storing, by the target terminal, the interactive information in a segment-tree structure also varies.

For example, after the interactive information acquired through the network channel established between the target terminal and the target server is acquired, the interactive information is immediately stored in the segment-tree structure. After the interactive information acquired along with the video stream fragment is acquired, it is determined whether the interactive timestamp in the interactive information is within a range of a start timestamp and an end timestamp of the reference video stream fragment serving as the transmission medium. If the interactive timestamp in the interactive information is within the range of the start timestamp and the end timestamp of the reference video stream fragment serving as the transmission medium, the interactive information is stored in the segment-tree structure after interactive service is processed according to the interactive data in the interactive information. If the interactive timestamp in the interactive information is not within the range of the start timestamp and the end timestamp of the reference video stream fragment serving as the transmission medium, the interactive information is directly stored in the segment-tree structure.

In step 207, the target terminal processes interactive service on the video stream according to the interactive timestamp and the interactive data in the interactive information.

In one embodiment, the processing, by the target terminal, interactive service on the video stream according to the interactive timestamp and the interactive data in the interactive information includes, but is not limited to, processing, by the target terminal, according to the interactive data in the interactive information, interactive service on a played video frame corresponding to the interactive timestamp in the video stream based on the interactive data. For example, in a process of playing the video stream, the target terminal determines, in the interactive information, target interactive information corresponding to a target played video frame that is currently being played according to the interactive timestamp in the interactive information, and processes interactive service on the target played video frame according to target interactive data in the target interactive information. The target played video frame is a played video frame having a timestamp consistent with a target interactive timestamp in the target interactive information.

In one embodiment, the target terminal determines, according to the interactive timestamp in the interactive information, target interactive information corresponding to a target played video frame that is currently being played in the interactive information in the following method: comparing a timestamp of the target played video frame that is currently being played with the interactive timestamp in the interactive information corresponding to the video stream, and taking interactive information including an interactive timestamp consistent with the timestamp of the target played video frame that is currently being played as the target interactive information corresponding to the target played video frame. After the target interactive information is determined, an interactive timestamp included in the target interactive information is taken as the target interactive timestamp, and interactive data included in the target interactive information is taken as target interactive data.

For example, processing interactive service on the target played video frame according to target interactive data in the target interactive information means performing, on the target played video frame, an action indicated by the target interactive data.

The target terminal continuously displays the played video frame in the process of playing the video stream, and when displaying the target played video frame, can process interactive service on the target played video frame according to the target interactive data in the target interactive information.

Next, in different scenarios, the process of processing interactive service on the target played video frame according to the target interactive data in the target interactive information is illustrated with examples.

In Scenario 1, the action indicated by the target interactive data includes displaying an interactive entry in a target form on the target played video frame, and the processing interactive service on the target played video frame according to the target interactive data in the target interactive information includes: displaying the interactive entry in the target from on the target played video frame according to the target interactive data; and displaying, in response to a trigger instruction for the interactive entry, the target played video frame and an interactive page corresponding to the interactive entry, and processing interactions based on interactive content on the interactive page.

Figure 9:
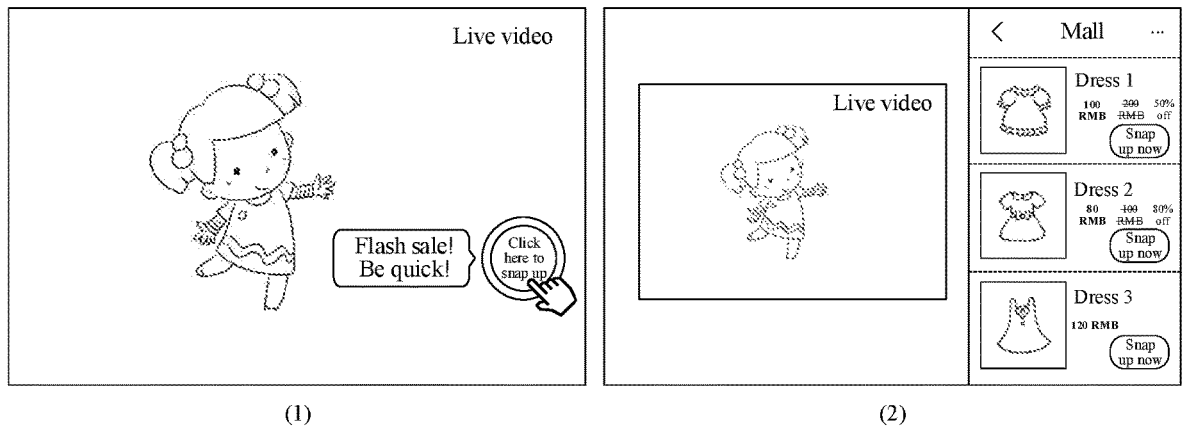
FIG. 9 is a schematic diagram of a process of interactive service processing according to an embodiment of this application.

For example, the interactive entry displayed in the target form on the target played video frame and included in the action indicated by the target interactive data is a mall entry, and the target form specified in the target interactive data is a form of a button plus a text label. When interactive service processed on the target played video frame according to the target interactive data, a button marked with words "Click here to snap up" and a text label with "Flash sale! Be quick!" can be displayed on the target played video frame in (1) of FIG. 9. When the target terminal detects a trigger instruction for the button, the target played video frame and a shopping page corresponding to the mall entry (i.e., the interactive page corresponding to the interactive entry) are displayed in the method in (2) of FIG. 9. Sales information of items in a mall is displayed on the shopping page. For example, the sales information of items in the mall includes information such as current prices, original prices, discounts, and purchase entries of the items. Therefore, interactions of shopping activities can be performed based on the shopping page.

In an exemplary embodiment, an application scenario of such interactive service processing includes: a host announcing the start of an activity in a live broadcast, and the target terminal displaying an entry to the activity. When the activity is an e-commerce activity, this process enables users to complete shopping while viewing the live broadcast without suspending the live broadcast, thereby improving user experience.

In Scenario 2, the action indicated by the target interactive data includes displaying an interactive page on the target played video frame. The processing interactive service on the target played video frame according to the target interactive data in the target interactive information includes: displaying the interactive page on the target played video frame according to the target interactive data, the interactive page displaying at least one piece of interactive content; displaying, in response to a selection instruction for any of the at least one piece of the interactive content, an interactive result corresponding to the any piece of interactive content; and processing interactions according to the interactive result.

In one embodiment, the process of displaying, in response to a selection instruction for any of the at least one piece of the interactive content, an interactive result corresponding to the any piece of interactive content involves: displaying a checkbox in response to the selection instruction for any of the at least one piece of the interactive content; and displaying, in response to a trigger instruction for the checkbox, the interactive result corresponding to the any piece of interactive content. That is, when the selection instruction for any of the at least one piece of the interactive content is detected, the checkbox is first displayed, and when the trigger instruction for the checkbox is detected, the interactive result corresponding to the any piece of interactive content is displayed.

In an exemplary embodiment, the processing interactions according to the interactive result includes, but is not limited to, displaying an interactive feedback entry according to the interactive result; and jumping, in response to a trigger instruction for the interactive feedback entry, to an interactive feedback page corresponding to the interactive feedback entry, and displaying an interactive feedback result based on the interactive feedback page.

Figure 10:
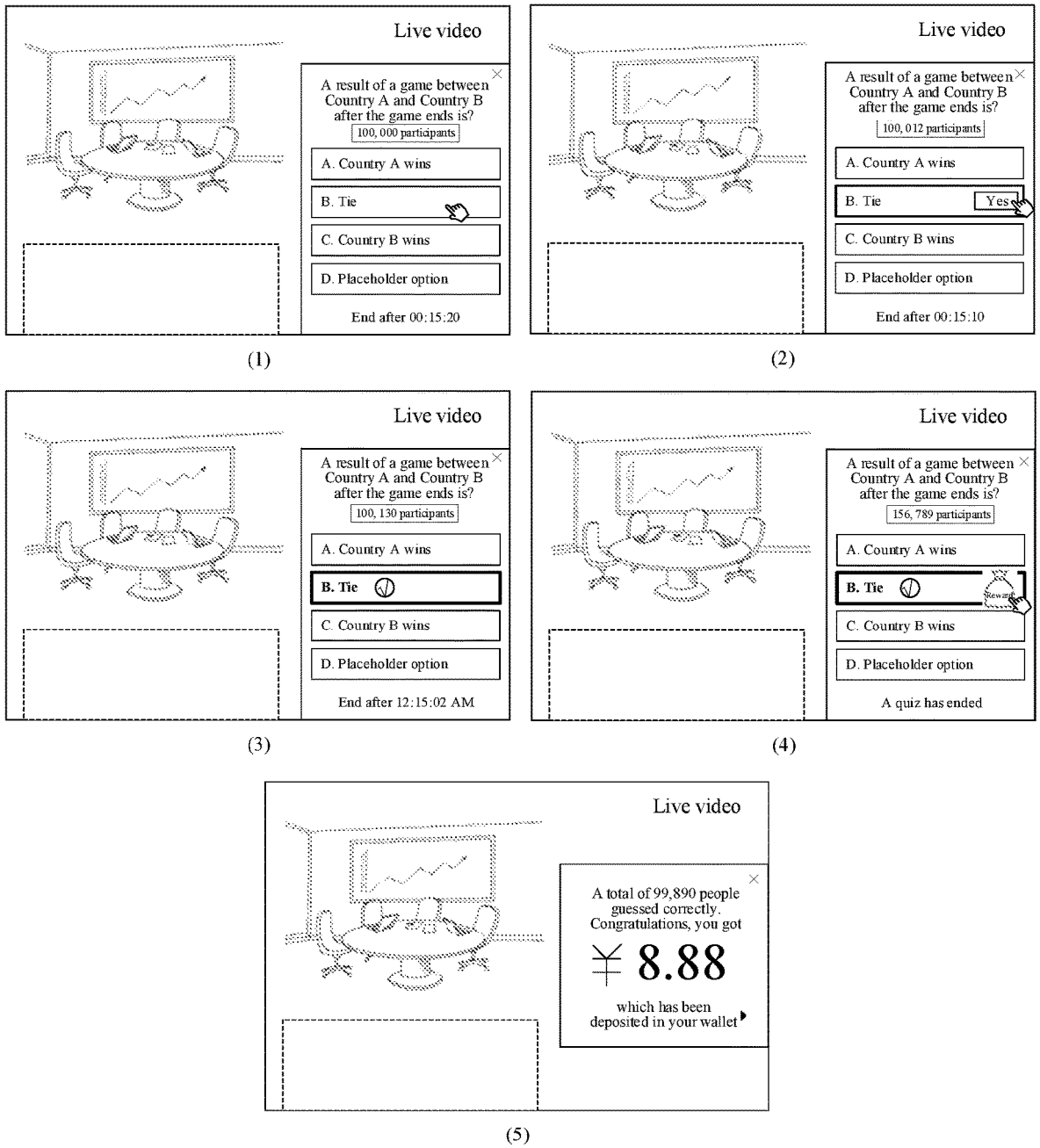
FIG. 10 is a schematic diagram of a process of interactive service processing according to an embodiment of this application.

For example, the interactive page displayed on the target played video frame and included in the action indicated by the target interactive data is a quiz board, and the interactive content on the interactive page indicated in the target interactive data is questions and quiz options on the quiz board. When interactive service is processed on the target played video frame according to the target interactive data, the quiz board is displayed on the target played video frame in the method shown in (1) of FIG. 10. Questions and quiz options are displayed on the quiz board. When a selection instruction for any quiz option (i.e., any piece of interactive content) on the quiz board is detected, the checkbox shown in (2) of FIG. 10 is displayed. When a trigger instruction for the checkbox is detected, a quiz result corresponding to the any quiz option (i.e., an interactive result corresponding to the any piece of interactive content) shown in (3) of FIG. 10 is displayed.

In a case that the quiz result is Success, after the quiz result is displayed, a lottery draw entry (i.e., the interactive feedback entry) is displayed according to the quiz result of Success, referring to (4) in FIG. 10. When a trigger instruction for the lottery draw entry is detected, a lottery draw page (i.e., the interactive feedback page corresponding to the interactive feedback entry) displayed in (5) of FIG. 10 is redirected to. An amount of reward (i.e., the interactive feedback result) is displayed on the lottery draw page. Based on the above process, an entire quiz process may be completed on a live broadcast page, which ensures that viewing the live broadcast and quizzing do not affect each other and enables users to view and play the live broadcast in a more immersed method.

In Scenario 3, the action indicated by the target interactive data includes delaying displaying information with a target keyword on the target played video frame. The target interactive data includes a latency. The target interactive timestamp is determined according to the latency. The processing interactive service on the target played video frame according to target interactive data in the target interactive information includes displaying, in response to the delay of the information with the target keyword and corresponding to the target played video frame, the information with the target keyword on the target played video frame.

In this case, the target played video frame determined according to the target interactive timestamp is a played video frame actually displaying the information with the target keyword after the delaying. In an exemplary embodiment, the target keyword refers to a spoiler-related word. Based on such an interactive service processing process, information with the spoiler-related word can be physically delayed in the process of playing the video stream, thereby ensuring the users' spoiler-free experience in viewing the live broadcast.

Figure 11:
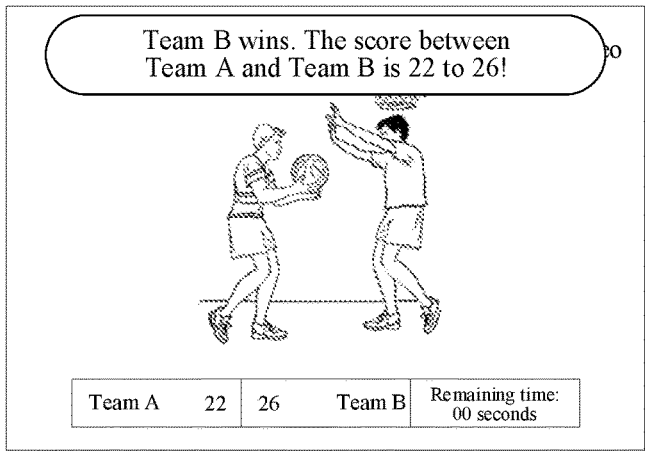
FIG. 11 is a schematic diagram of a process of interactive service processing according to an embodiment of this application.
Figure 11:
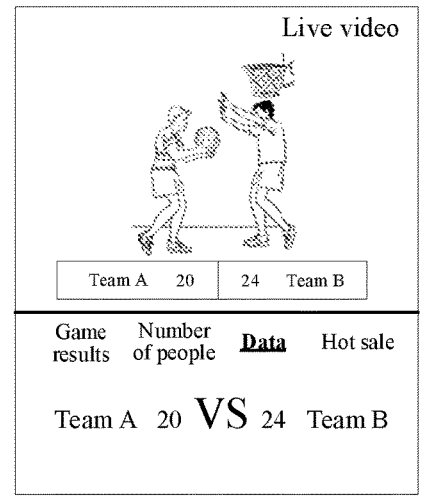
Figure 11:
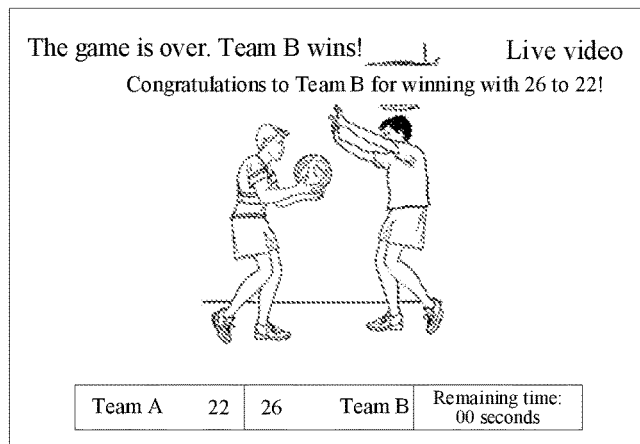

For example, the information with the target keyword refers to news information with a game result, and the action indicated by the target interactive data includes delaying displaying the news information with the game result on the target played video frame. As shown in (1) of FIG. 11, when interactive service is processed on the target played video frame according to target interactive data, the news information with the game result is displayed on the target played video frame on which a game just ends.

In another example, the information with the target keyword refers to game data information with scores, and the action indicated by the target interactive data includes delaying displaying the game data information with the scores on the target played video frame. As shown in (2) of FIG. 11, when interactive service is processed on the target played video frame according to target interactive data, the game data information with the scores is displayed on the target played video frame matching game data.

In another example, the information with the target keyword refers to bullet-screen or comment information with a game result, and the action indicated by the target interactive data includes delaying displaying the bullet screen or comment information with the game result on the target played video frame. As shown in (3) of FIG. 11, when interactive service is processed on the target played video frame according to target interactive data, the bullet-screen or comment information with the game result is displayed on the target played video frame on which a game just ends.

In Scenario 4, the action indicated by the target interactive data includes setting a target region on the target played video frame to a triggerable mode, and the processing interactive service on the target played video frame according to target interactive data in the target interactive information includes: setting the target region on the target played video frame to the triggerable mode according to the target interactive data; and displaying, in response to a trigger instruction for the target region, information corresponding to the target region on the target played video frame.

In one embodiment, the displaying information corresponding to the target region on the target played video frame includes, but is not limited to, displaying the information corresponding to the target region on the target played video frame in a form of a translucent page.

In one embodiment, the information corresponding to the target region includes one or more pieces of selection information. In response to a trigger instruction for any of the one or more pieces of selection information, detailed information corresponding to the any one piece of selection information is displayed.

Figure 12:
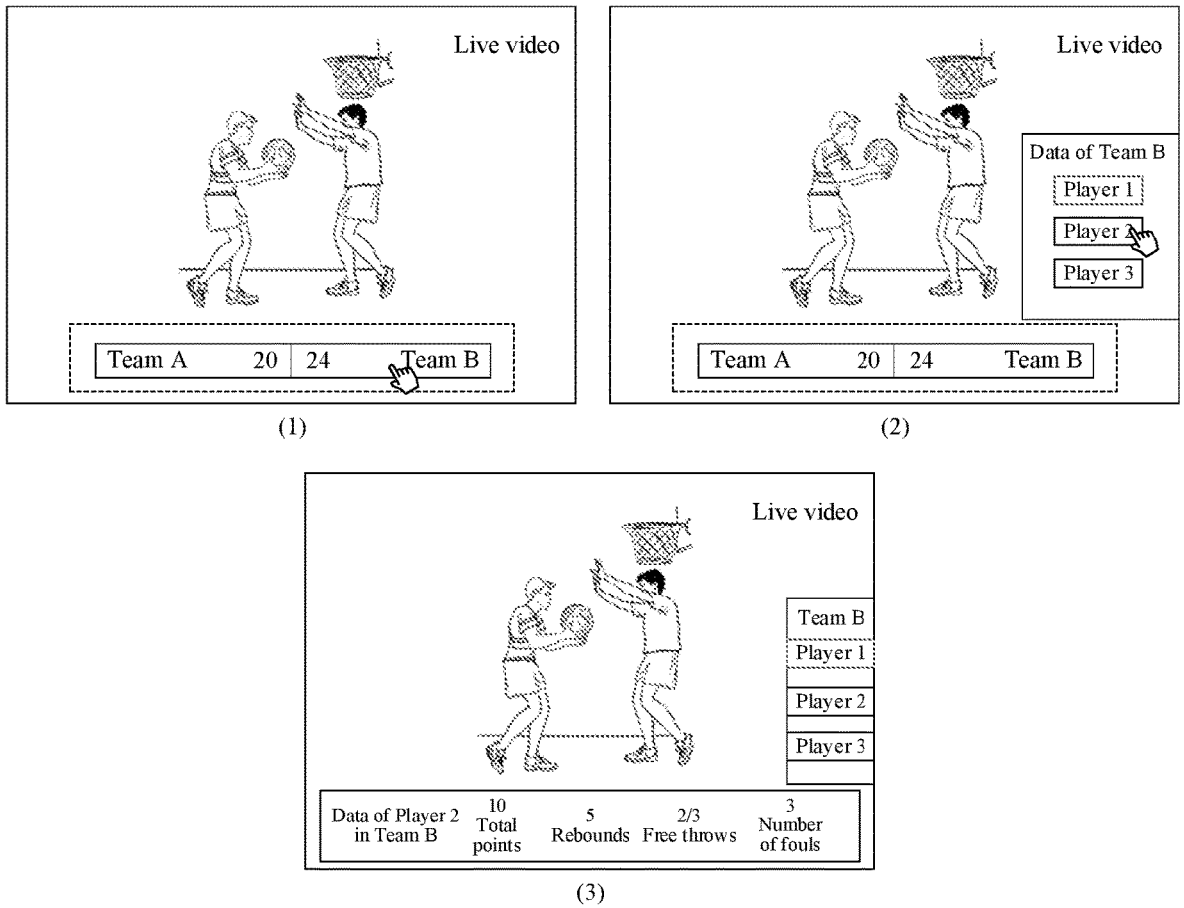
FIG. 12 is a schematic diagram of a process of interactive service processing according to an embodiment of this application.

For example, the action indicated by the target interactive data includes setting a scoreboard region (i.e., the target region) to the triggerable mode. When interactive service is processed on the target played video frame according to target interactive data, the scoreboard region in (1) of FIG. 12 is set to the triggerable mode. When a trigger instruction for the scoreboard region is detected, information corresponding to the scoreboard region is displayed in the form of the translucent page. For example, the information corresponding to the scoreboard region refers to information of Team B shown in (2) of FIG. 12. When a trigger instruction for Player 2 (i.e., any piece of selection information) is detected in (2) of FIG. 12, detailed information corresponding to Player 2 shown in (3) of FIG. 12 is displayed. The detailed information corresponding to Player 2 includes, but is not limited to, information such as total points, rebounds, free throws, and number of fouls of Player 2. This process enables the users to conveniently view information in the process of viewing the live broadcast in a landscape method.

When the information is displayed in the form of the translucent page, shielding of a live video frame can be prevented.

In Scenario 5, the target interactive information includes content displayed on a reference live video frame during the live broadcast and a timestamp of the reference live video frame. The action indicated by the target interactive data includes displaying, on the target played video frame, the content displayed on the reference live video frame. The processing interactive service on the target played video frame according to target interactive data in the target interactive information includes displaying, on the target played video frame according to the target interactive data, the content displayed on the reference live video frame.

Figure 13:
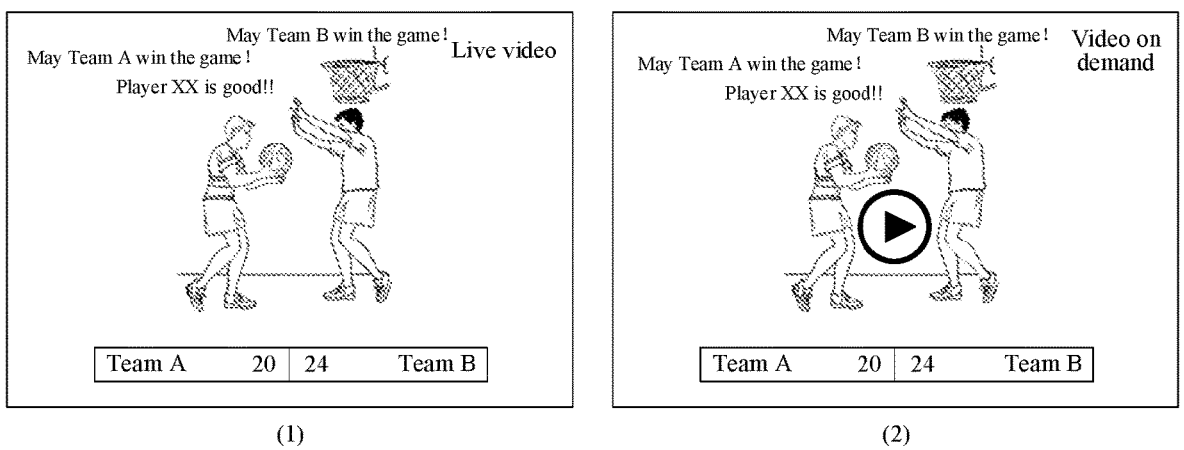
FIG. 13 is a schematic diagram of a process of interactive service processing according to an embodiment of this application.

For example, content displayed on any live video frame during the live broadcast includes comments or bullet screens. The any live video frame is shown in (1) of FIG. 13. The target played video frame is a played video frame during video on demand. When any live video frame corresponds to the target played video frame during video on demand, the any live video frame is taken as the reference live video frame. The action indicated by the target interactive data includes displaying, on the target played video frame, bullet screens or comments displayed on the reference live video frame, and when interactive service is processed on the target played video frame according to the target interactive data, comments or bullet screens consistent with those on the reference live video frame in (1) of FIG. 13 are displayed on the target played video frame in (2) of FIG. 13. This process can automatically convert live broadcast comments or bullet screens into on-demand comments or bullet screens, enriching interactive content on-demand.

Based on the interactive service processing method according to the embodiments of this application, the following technical effects can be achieved: 1. Low latency. Interactive information is timestamp-based and can be delivered in advance, which can prevent impossible revocation of the interactive information, reduce network overheads prior to execution of the action indicated by the interactive data in the interactive information, and reduce a latency in real-time synchronization. 2. High arrival rate. The terminal can not only acquire historical interactive information, but also acquire the interactive information in a transmission mode combining transmission based on a network channel and transmission with a video stream fragment as a medium. The interactive information may be acquired multiple times, which weakens the influence of "key frame" on the whole real-time interactive process and improves an arrival rate of the interactive information. 3. Support for more scenarios. The transmission mode combining transmission based on a network channel and transmission with a video stream fragment as a medium not only meets common network broadcast and on-demand application scenarios, but also better supports temporary and variable we-media live broadcast because the network channel no longer depends on hardware devices. In addition, the use of flexible and extensible interactive information formats, combined with the aggregation and splitting of the interactive information, can support the delivery of more variable interactive information, which can well meet mass-flow and high-concurrency live variety shows or events, and lay a foundation for a requirement on synchronization of event images and interactive data.

In the embodiments of this application, the target server transmits the interactive information to the target terminal based on one or more transmission modes corresponding to the interactive information. The target terminal processes interactive service on the video stream according to the interactive timestamp and the interactive data in the interactive information. During the interactive service processing, the interactive information includes an interactive timestamp and interactive data. The setting of the interactive timestamp enables the interactive information to be transmitted to the target terminal in one or more transmission modes, which increases an arrival rate of the interactive information and expands application scenarios of the interactive service processing, thereby improving an interactive service processing effect.

Figure 14:
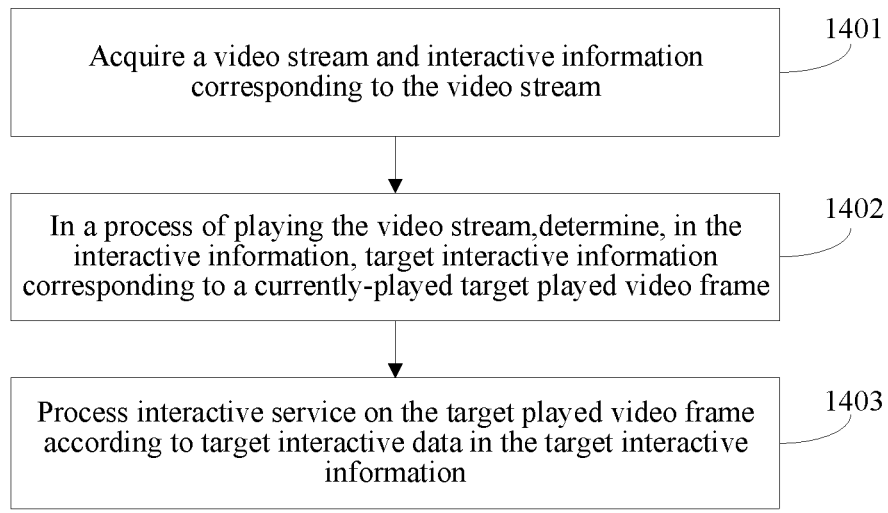
FIG. 14 is a flowchart of an interactive service processing method according to an embodiment of this application.

An embodiment of this application further provides an interactive service processing method applied to, for example, a target terminal. As shown in FIG. 14, the method according to the embodiments of this application includes the following steps:

In step 1401, a video stream and interactive information corresponding to the video stream are acquired.

The interactive information includes interactive data.

The target terminal can be connected to a target server, and then acquires the video stream and the interactive information corresponding to the video stream from the target server.

For example, the detailed implementation of step 1401 can be referred from step 201 to step 206 in the embodiment shown in FIG. 2, which is not described in detail herein.

In step 1402, target interactive information corresponding to a target played video frame that is currently being played is determined in the interactive information in the process of playing the video stream.

The target interactive information corresponding to the target played video frame that is currently being played can be determined in the interactive information corresponding to the video stream in the process of playing the video stream.

In one embodiment, the interactive information includes an interactive timestamp, and the target interactive information corresponding to the target played video frame that is currently being played is determined in the interactive information in the following method: comparing a timestamp of the target played video frame that is currently being played with the interactive timestamp in the interactive information corresponding to the video stream, and taking interactive information including an interactive timestamp consistent with the timestamp of the target played video frame as the target interactive information.

The implementation of step 1402 can be referred from step 207 in the embodiment shown in FIG. 2, which is not described in detail herein.

In step 1403, interactive service is processed on the target played video frame according to the target interactive data in the target interactive information.

The implementation of step 1403 can be referred from step 207 in the embodiment shown in FIG. 2, which is not described in detail herein. The interactive service is processed on the target played video frame according to the target interactive data in the target interactive information in, but not limited to, any one of the processing methods in Scenario 1 to Scenario 5 described in step 207 in the embodiment shown in FIG. 2.

In the embodiments of this application, the target terminal determines the target interactive information corresponding to the target played video frame that is currently being played, and processes interactive service on the target played video frame according to target interactive data in the target interactive information. Based on this interactive service processing method, interactive service can be processed in real time on the target played video frame according to the target interactive data in the target interactive information in the process of playing the video stream, which expands application scenarios of the interactive service processing, thereby improving an interactive service processing effect.

An embodiment of this application provides an interactive service processing system. The system includes: a target terminal and a target server.

The target server is configured to acquire a video stream and interactive information corresponding to the video stream, the interactive information including an interactive timestamp and interactive data, the interactive timestamp being a timestamp of a reference encoded video frame, and the reference encoded video frame being an encoded video frame corresponding to the interactive information in the video stream; determine a transmission mode corresponding to the interactive information, the transmission mode corresponding to the interactive information including at least one of transmission based on a network channel and transmission with a video stream fragment as a medium; and transmit the video stream to the target terminal.

The target terminal is configured to receive the video stream transmitted by the target server.

The target server is further configured to transmit the interactive information to the target terminal based on the transmission mode corresponding to the interactive information.

The target terminal is further configured to acquire the interactive information corresponding to the video stream transmitted by the target server; and process interactive service on the video stream according to the interactive timestamp and the interactive data in the interactive information.

In the embodiments of this application, the target server transmits the interactive information to the target terminal based on one or more transmission modes corresponding to the interactive information. The target terminal processes interactive service on the video stream according to the interactive timestamp and the interactive data in the interactive information. During the interactive service processing, the interactive information includes an interactive timestamp and interactive data. The setting of the interactive timestamp enables the interactive information to be transmitted to the target terminal in one or more transmission modes, which increases an arrival rate of the interactive information and expands application scenarios of the interactive service processing, thereby improving an interactive service processing effect.

Figure 15:
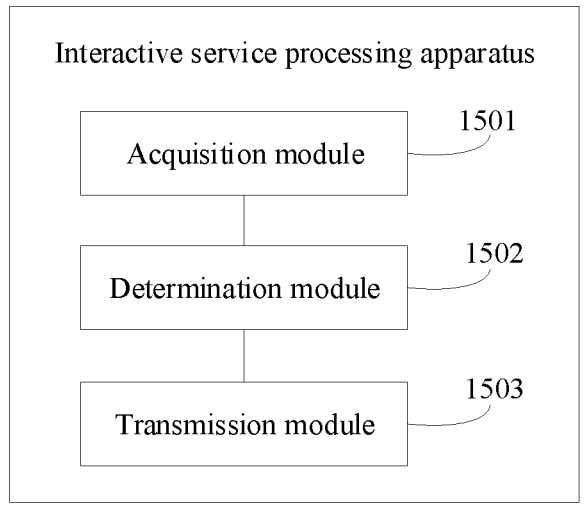
FIG. 15 is a schematic diagram of an interactive service processing apparatus according to an embodiment of this application.

Referring to FIG. 15, an embodiment of this application provides an interactive service processing apparatus. The apparatus includes:

an acquisition module 1501, configured to acquire a video stream and interactive information corresponding to the video stream, the interactive information including an interactive timestamp and interactive data, the interactive timestamp being a timestamp of a reference encoded video frame, and the reference encoded video frame being an encoded video frame corresponding to the interactive information in the video stream;

a determination module 1502, configured to determine a transmission mode corresponding to the interactive information, the transmission mode corresponding to the interactive information including at least one of transmission based on a network channel and transmission with a video stream fragment as a medium; and a transmission module 1503, configured to transmit the video stream to a target terminal;

the transmission module 1503 being further configured to transmit the interactive information to the target terminal based on the transmission mode corresponding to the interactive information, the target terminal being configured to process interactive service on the video stream according to the interactive timestamp and the interactive data in the interactive information.

In one embodiment, the acquisition module 1501 is further configured to acquire, in response to the transmission mode corresponding to the interactive information including transmission with a video stream fragment as a medium, a streaming media file corresponding to a reference video stream fragment.

Figure 16:
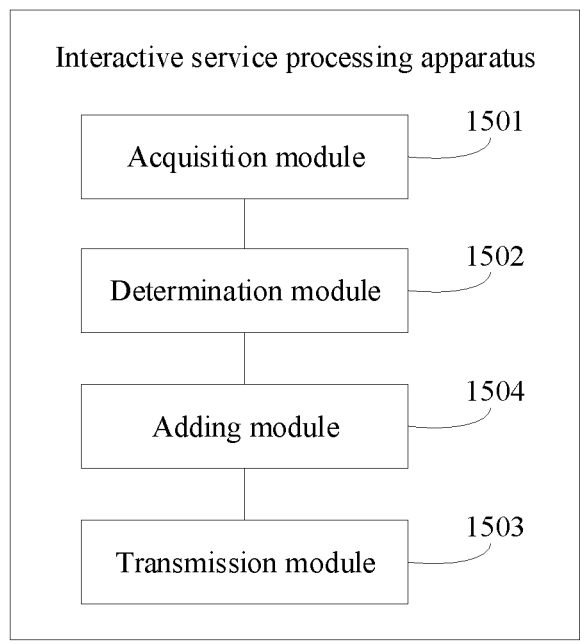
FIG. 16 is a schematic diagram of an interactive service processing apparatus according to an embodiment of this application.

Referring to FIG. 16, the apparatus further includes:

an adding module 1504, configured to add the interactive information to the streaming media file in a form of a private label to obtain a target streaming media file; and the transmission module 1503 being further configured to transmit the target streaming media file to the target terminal.

In one embodiment, the acquisition module 1501 is further configured to perform at least one of the following:

acquiring, based on a first interface, first interactive information corresponding to the video stream, the first interactive information being interactive information generated by an internal management backend; and acquiring, based on a second interface, second interactive information corresponding to the video stream, the second interactive information being interactive information that is not generated by the internal management backend.

In one embodiment, the acquisition module 1501 is further configured to receive, based on a third interface, a historical interactive information acquisition request transmitted by the target terminal; and acquire, based on the historical interactive information acquisition request, historical interactive information corresponding to the video stream; and the transmission module 1503 is further configured to transmit the historical interactive information to the target terminal.

In the embodiments of this application, the target server transmits the interactive information to the target terminal based on one or more transmission modes corresponding to the interactive information. The target terminal processes interactive service on the video stream according to the interactive timestamp and the interactive data in the interactive information. During the interactive service processing, the interactive information includes an interactive timestamp and interactive data. The setting of the interactive timestamp enables the interactive information to be transmitted to the target terminal in one or more transmission modes, which increases an arrival rate of the interactive information and expands application scenarios of the interactive service processing, thereby improving an interactive service processing effect.

Figure 17:
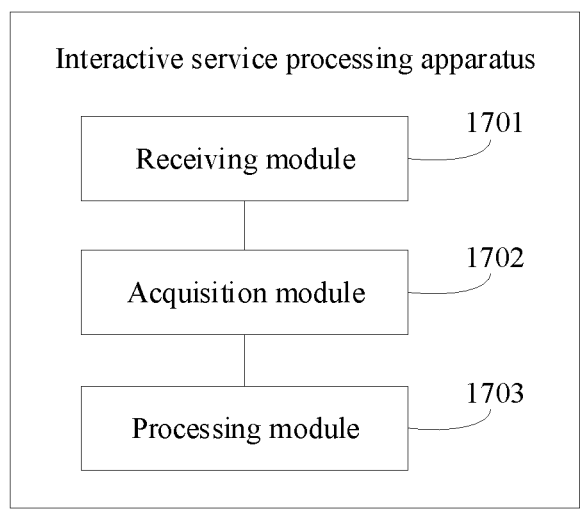
FIG. 17 is a schematic diagram of an interactive service processing apparatus according to an embodiment of this application.

Referring to FIG. 17, an embodiment of this application further provides an interactive service processing apparatus. The apparatus includes:

a receiving module 1701, configured to receive a video stream transmitted by a target server;

an acquisition module 1702, configured to acquire interactive information corresponding to the video stream transmitted by the target server, the interactive information including an interactive timestamp and interactive data, the interactive timestamp being a timestamp of a reference encoded video frame, and the reference encoded video frame being an encoded video frame corresponding to the interactive information in the video stream; and a processing module 1703, configured to process interactive service on the video stream according to the interactive timestamp and the interactive data in the interactive information.

In one embodiment, the acquisition module 1702 is further configured to receive a target streaming media file transmitted by the target server; and parse a private label in the target streaming media file to obtain target interactive information.

Figure 18:
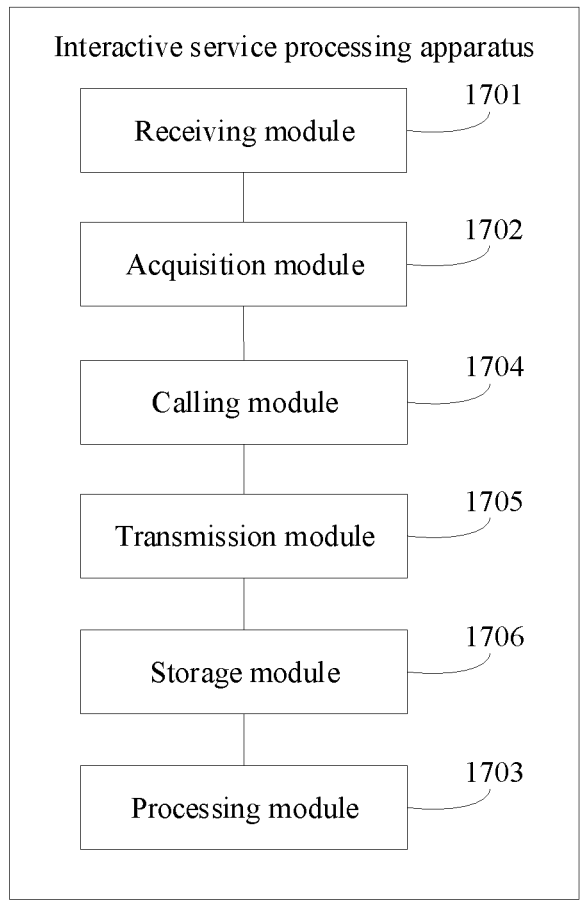
FIG. 18 is a schematic diagram of an interactive service processing apparatus according to an embodiment of this application.

In one embodiment, referring to FIG. 18, the apparatus further includes:

a calling module 1704, configured to call a third interface of the target server;

a transmission module 1705, configured to transmit a historical interactive information acquisition request to the target server;

the receiving module 1701 being further configured to receive historical interactive information corresponding to the video stream transmitted by the target server; and the processing module 1703 being further configured to process interactive service based on historical interactive data in the historical interactive information.

In one embodiment, referring to FIG. 18, the apparatus further includes:

a storage module 1706, configured to store the interactive information in a segment-tree structure.

In one embodiment, the processing module 1703 is further configured to: in a process of playing the video stream, determine, in the interactive information, target interactive information corresponding to a target played video frame that is currently being played according to the interactive timestamp in the interactive information; and process interactive service on the target played video frame according to target interactive data in the target interactive information.

In the embodiments of this application, the target server transmits the interactive information to the target terminal based on one or more transmission modes corresponding to the interactive information. The target terminal processes interactive service on the video stream according to the interactive timestamp and the interactive data in the interactive information. During the interactive service processing, the interactive information includes an interactive timestamp and interactive data. The setting of the interactive timestamp enables the interactive information to be transmitted to the target terminal in one or more transmission modes, which increases an arrival rate of the interactive information and expands application scenarios of the interactive service processing, thereby improving an interactive service processing effect.

Figure 19:
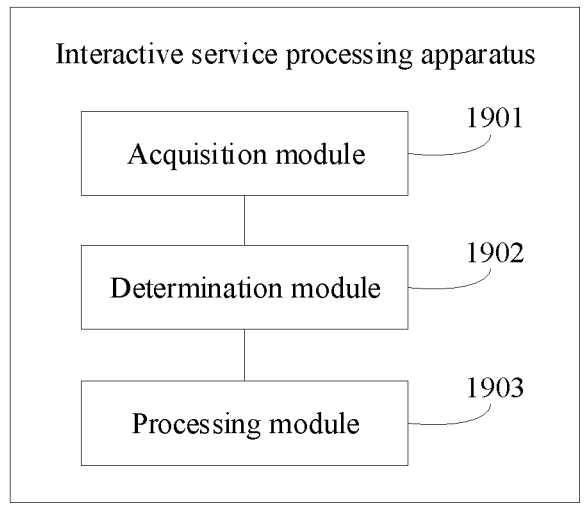
FIG. 19 is a schematic diagram of an interactive service processing apparatus according to an embodiment of this application.

Referring to FIG. 19, an embodiment of this application further provides an interactive service processing apparatus. The apparatus includes:

an acquisition module 1901, configured to acquire a video stream and interactive information corresponding to the video stream, the interactive information including interactive data;

a determination module 1902, configured to determine, in the interactive information, target interactive information corresponding to a target played video frame that is currently being played in the process of playing the video stream; and a processing module 1903, configured to process interactive service on the target played video frame according to the target interactive data in the target interactive information.

Figure 20:
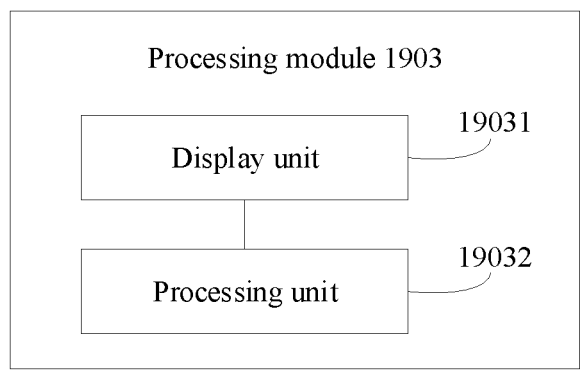
FIG. 20 is a schematic structural diagram of a processing module according to an embodiment of this application.

In one embodiment, an action indicated by the target interactive data includes displaying an interactive entry in a target form on the target played video frame. Referring to FIG. 20, the processing module 1903 includes:

a display unit 19031, configured to display the interactive entry in the target from on the target played video frame according to the target interactive data;

the display unit 19031 being further configured to display, in response to a trigger instruction for the interactive entry, the target played video frame and an interactive page corresponding to the interactive entry; and a processing unit 19032, configured to processing interactions based on interactive content on the interactive page.

In one embodiment, the action indicated by the target interactive data includes displaying the interactive page on the target played video frame, and the display unit 19031 is further configured to display the interactive page on the target played video frame according to the target interactive data, the interactive page displaying at least one piece of interactive content; and display, in response to a selection instruction for any of the at least one piece of the interactive content, an interactive result corresponding to the any piece of interactive content; and the processing unit 19032 is further configured to processing interactions according to the interactive result.

In one embodiment, the display unit 19031 is further configured to display a checkbox in response to the selection instruction for any of the at least one piece of the interactive content; and displaying, in response to a trigger instruction for the checkbox, the interactive result corresponding to the any piece of interactive content.

In one embodiment, the display unit 19031 is further configured to display an interactive feedback entry according to the interactive result; and the processing unit 19032 is further configured to jump, in response to a trigger instruction for the interactive feedback entry, to an interactive feedback page corresponding to the interactive feedback entry, and display an interactive feedback result based on the interactive feedback page.

In one embodiment, the action indicated by the target interactive data includes delaying displaying information with a target keyword, and the display unit 19031 is further configured to display, in response to the delay of the information with the target keyword and corresponding to the target played video frame, the information with the target keyword on the target played video frame.

In one embodiment, the action indicated by the target interactive data includes setting a target region on the target played video frame to a triggerable mode, and the display unit 19031 is further configured to set the target region on the target played video frame to the triggerable mode according to the target interactive data; and display, in response to a trigger instruction for the target region, information corresponding to the target region on the target played video frame.

In one embodiment, the display unit 19031 is further configured to display the information corresponding to the target region on the target played video frame in a form of a translucent page.

In one embodiment, the information corresponding to the target region includes one or more pieces of selection information, and display unit 19031 is further configured to display, in response to a trigger instruction for any of the one or more pieces of selection information, detailed information corresponding to the any one piece of selection information is displayed.

In one embodiment, the action indicated by the target interactive data includes displaying, on the target played video frame, content displayed on a reference live video frame, and the display unit 19031 is further configured to display, on the target played video frame according to the target interactive data, the content displayed on the reference live video frame.

In the embodiments of this application, the target terminal determines the target interactive information corresponding to the target played video frame that is currently being played, and processes interactive service on the target played video frame according to target interactive data in the target interactive information. Based on this interactive service processing method, interactive service can be processed in real time on the target played video frame according to the target interactive data in the target interactive information in the process of playing the video stream, which expands application scenarios of the interactive service processing, thereby improving an interactive service processing effect.

When the apparatus provided in the foregoing embodiments implements functions of the apparatus, the division of the foregoing functional modules is merely an example for description. In some embodiments, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same concept. For the specific implementation process, reference may be made to the method embodiments, and details are not described herein again.

The units or modules described in the embodiments of the present disclosure may be implemented as a software program, or may be implemented in a hardware component, and the described units or modules may also be disposed in a processor. Names of the units do not constitute a limitation on the units or modules in a specific case. Particularly, according to an embodiment of the present disclosure, the processes described above by referring to the flowcharts may be implemented as computer software programs. For example, the embodiments of this application include a computer program product, including a computer program carried on a computer-readable medium. The computer program includes program code for performing the method shown in the flowchart. In some embodiments, the processes described above by referring to the flowcharts may also be implemented as computer software programs in combination of hardware components.

Figure 21:
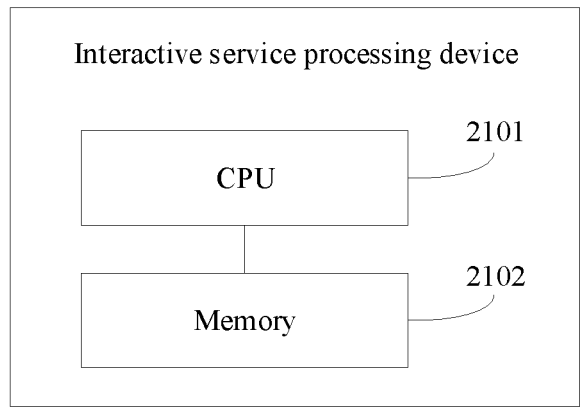
FIG. 21 is a schematic structural diagram of an interactive service processing device according to an embodiment of this application.

FIG. 21 is a schematic structural diagram of an interactive service processing device according to an embodiment of this application. The interactive service processing device is a server. The server may vary due to different configurations or performance. The server includes one or more central processing units (CPUs) 2101 and one or more memories 2102. The one or more memories 2102 store at least one program code loaded and executed by the one or more CPUs 2101 to implement the interactive service processing methods according to the above method embodiments. Certainly, the server may also have a wired or wireless network interface, a keyboard, an input/output interface and other components to facilitate input/output. The server may also include other components for implementing device functions. Details are not described herein again.

Figure 22:
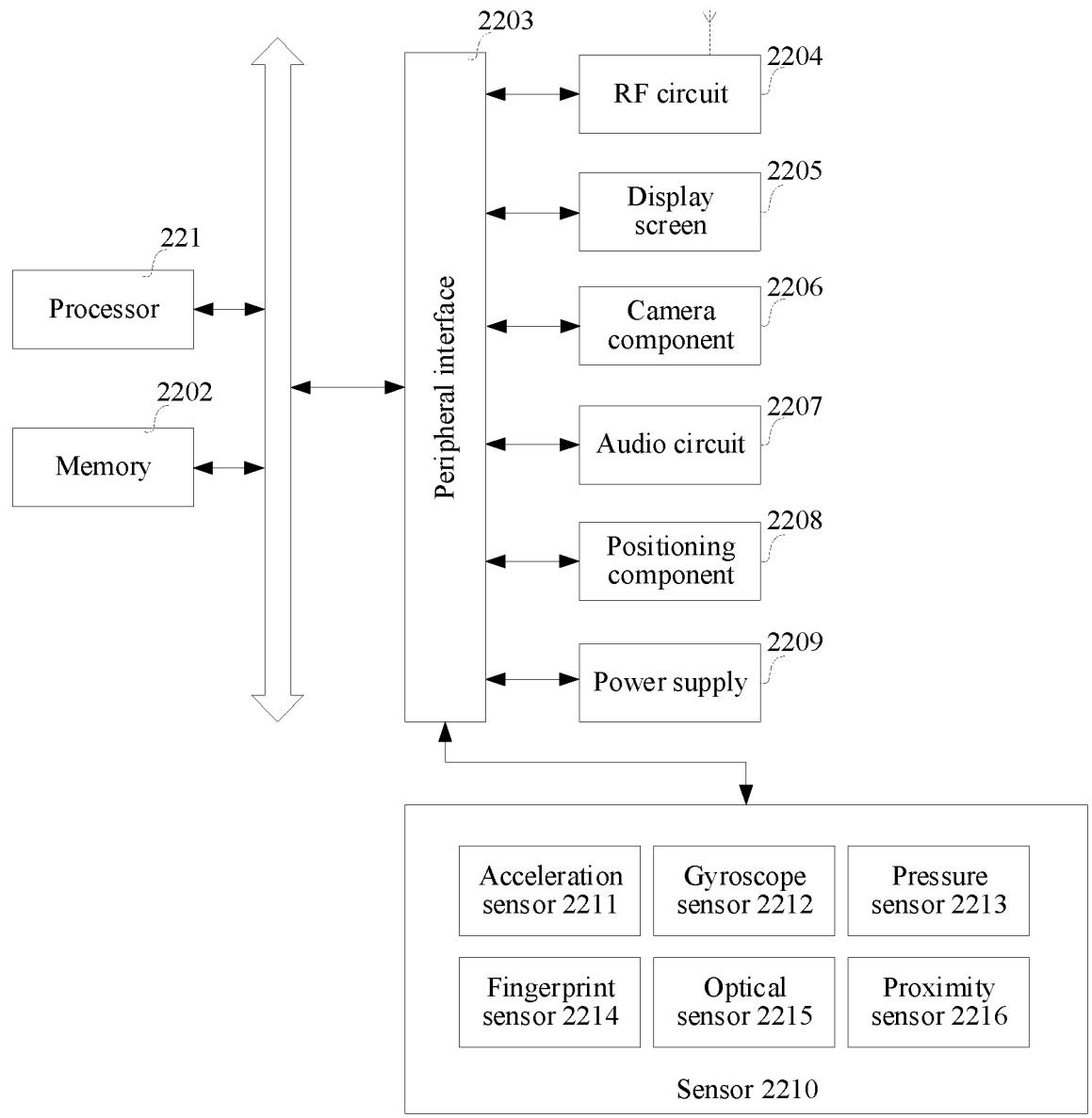
FIG. 22 is a schematic structural diagram of an interactive service processing device according to an embodiment of this application.

FIG. 22 is a schematic structural diagram of an interactive service processing device according to an embodiment of this application. The interactive service processing device is a terminal. For example, the terminal may be a smartphone, a tablet computer, a Moving Picture Experts Group Audio Layer III (MP3) player, a Moving Picture Experts Group Audio Layer IV (MP4) player, a notebook computer, or a desktop computer. The terminal may also be referred to as user equipment, a portable terminal, a laptop terminal, or a desktop terminal, among other names.

Generally, the terminal includes a processor 2201 and a memory 2202.

The processor 2201 includes one or more processing cores, for example, a 4-core processor or an 8-core processor. The processor 2201 is implemented by at least one hardware form of a digital signal processor (DSP), a field-programmable gate array (FPGA), and a programmable logic array (PLA). The processor 2201 may alternatively include a main processor and a coprocessor. The main processor is configured to process data in an active state, also referred to as a CPU. The coprocessor is a low-power processor configured to process data in a standby state. In some embodiments, the processor 2201 may be integrated with a graphics processing unit (GPU). The GPU is configured to render and draw content that needs to be displayed on a display screen. In some embodiments, the processor 2201 further includes an artificial intelligence (AI) processor. The AI processor is configured to process a computing operation related to machine learning.

The memory 2202 includes one or more computer-readable storage media. The computer-readable storage medium is non-transient. The memory 2202 further includes a high-speed random access memory and a nonvolatile memory, for example, one or more disk storage devices, or flash memory devices. In some embodiments, a non-transitory computer-readable storage medium in the memory 2202 is configured to store at least one instruction, the at least one instruction being configured to be executed by the processor 2201 to implement the interactive service processing method provided in the method embodiments of this application.

In some embodiments, the terminal may include a peripheral interface 2203 and at least one peripheral. The processor 2201, the memory 2202 and the peripheral interface 2203 can be connected by a bus or a signal line. Each peripheral device may be connected to the peripheral interface 2203 through the bus, the signal line, or a circuit board. For example, the peripheral device includes at least one of a radio frequency (RF) circuit 2204, a touch display screen 2205, a camera component 2206, an audio circuit 2207, a positioning component 2208, and a power supply 2209.

In some embodiments, the terminal may further include one or more sensors 2210. The one or more sensors 2210 include, but are not limited to, an acceleration sensor 2211, a gyroscope sensor 2212, a pressure sensor 2213, a fingerprint sensor 2214, an optical sensor 2215, and a proximity sensor 2216.

A person skilled in the art can understand that the structure shown in FIG. 22 does not constitute a limitation to the terminal, and the terminal may include more or fewer components than those shown in the figure, or some components may be combined, or a different component arrangement may be used.

In an exemplary embodiment, a computer device is further provided. The computer device includes a processor and a memory. The memory stores at least one program code. The at least one program code is loaded and executed by one or more processors to implement any one of the above interactive service processing methods.

In an exemplary embodiment, a non-transitory computer-readable storage medium is further provided. The non-transitory computer-readable storage medium stores at least one program code loaded and executed by a processor of a computer device to implement any one of the above interactive service processing methods.

In some embodiments, the non-transitory computer-readable storage medium is a read-only memory (ROM), a random access memory (RAM), a compact disc ROM (CD-ROM), a magnetic tape, a floppy disk, an optical data storage device, or the like.

In an exemplary embodiment, a computer program product is further provided. The computer program product stores at least one computer program loaded and executed by a processor of a computer device to implement any one of the above interactive service processing methods.

A plurality of mentioned in the specification means two or more. The "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

In the specification, claims, and accompanying drawings of this application, the terms "first", "second", and so on are intended to distinguish between similar objects but do not necessarily indicate a specific order or sequence. It is to be understood that the data termed in such a way is interchangeable in proper circumstances, so that the embodiments of this application described herein can be implemented in other sequences than the sequence illustrated or described herein. The exemplary embodiments do not represent all embodiments that are consistent with this application. On the contrary, these embodiments are merely examples of apparatuses and methods that are described in detail in the appended claims and that are consistent with some aspects of this application.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. An interactive service processing method implemented by a target server, the method comprising:
    acquiring a video stream and interactive information corresponding to the video stream, the interactive information comprising an interactive timestamp and interactive data;
    determining a transmission mode corresponding to the interactive information, the transmission mode comprising one of transmission based on a network channel and transmission with a video stream fragment as a medium;
    transmitting the video stream to a target terminal; and
    transmitting the interactive information to the target terminal based on the transmission mode corresponding to the interactive information, the interactive information being transmitted at a time different than a time of transmitting the video stream, the target terminal being configured to process interactive service on the video stream according to the interactive timestamp and the interactive data in the interactive information.

2. The method according to claim 1, wherein
    the transmission mode corresponding to the interactive information comprises transmission with the video stream fragment as the medium, and transmitting the interactive information to the target terminal comprises:

adding the interactive information to a streaming media file in a form of a private label to obtain a target streaming media file; and transmitting the target streaming media file to the target terminal.

3. The method according to claim 1, wherein the interactive information corresponding to the video stream is acquired by one of the following methods:

acquiring, based on a first interface, first interactive information corresponding to the video stream, the first interactive information being interactive information generated by an internal management backend; and acquiring, based on a second interface, second interactive information corresponding to the video stream, the second interactive information being interactive information that is not generated by the internal management backend.

4. The method according to claim 1, wherein the method further comprises:

receiving, based on a third interface, a historical interactive information acquisition request transmitted by the target terminal; and acquiring, based on the historical interactive information acquisition request, historical interactive information corresponding to the video stream.

5. An interactive service processing method, applicable to a target terminal, the method comprising:

receiving a video stream transmitted by a target server;

acquiring interactive information corresponding to the video stream transmitted by the target server, the interactive information comprising an interactive timestamp and interactive data, the interactive information being received at a time different than a time of receiving the video stream; and processing interactive service on the video stream according to the interactive timestamp and the interactive data in the interactive information.

6. The method according to claim 5, wherein the acquiring interactive information corresponding to the video stream transmitted by the target server comprises:

receiving a target streaming media file transmitted by the target server; and parsing a private label in the target streaming media file to obtain the interactive information.

7. The method according to claim 5, wherein the method further comprises:

calling a third interface of the target server to transmit a historical interactive information acquisition request to the target server; and receiving historical interactive information corresponding to the video stream transmitted by the target server.

8. The method according to claim 5, wherein the method further comprises:

storing the interactive information in a segment-tree structure.

9. The method according to claim 5, wherein the processing interactive service on the video stream according to the interactive timestamp and the interactive data in the interactive information comprises:

determining, in the interactive information, target interactive information corresponding to a target played video frame that is currently being played according to the interactive timestamp in the interactive information; and processing interactive service on the target played video frame according to target interactive data in the target interactive information.

10. The method according to claim 9, wherein the processing interactive service on the target played video frame according to target interactive data in the target interactive information comprises:

displaying an interactive entry in the target played video frame according to the target interactive data; and displaying, in response to a trigger instruction for the interactive entry, the target played video frame and an interactive page corresponding to the interactive entry, and processing interactions based on interactive content on the interactive page.

11. The method according to claim 9, wherein processing interactive service on the target played video frame according to target interactive data in the target interactive information comprises:

displaying an interactive page, the interactive page displaying at least one piece of interactive content;

displaying, in response to a selection instruction for any of the at least one piece of the interactive content, an interactive result corresponding to the any piece of interactive content; and processing interactions according to the interactive result.

12. The method according to claim 11, wherein the processing interactions according to the interactive result comprises:

displaying an interactive feedback entry according to the interactive result; and jumping, in response to a trigger instruction for the interactive feedback entry, to an interactive feedback page corresponding to the interactive feedback entry.

13. The method according to claim 9, wherein processing interactive service on the target played video frame according to target interactive data in the target interactive information comprises:

displaying, information with a target keyword on the target played video frame.

14. The method according to claim 9, wherein processing interactive service on the target played video frame according to target interactive data in the target interactive information comprises:

setting a target region on the target played video frame to a triggerable mode; and displaying, in response to a trigger instruction for the target region, information corresponding to the target region on the target played video frame.

15. The method according to claim 14, wherein the information corresponding to the target region comprises one or more pieces of selection information; and the method further comprises:

displaying, in response to a trigger instruction for any of one or more pieces of selection information, information corresponding to the selection information.

16. The method according to claim 9, wherein processing interactive service on the target played video frame according to target interactive data in the target interactive information comprises:

displaying, on the target played video frame according to the target interactive data, an content displayed on an reference live video frame.

17. An interactive service processing system, comprising:

a terminal and a server;

the server being configured to acquire a video stream and interactive information corresponding to the video stream, the interactive information comprising an interactive timestamp and interactive data; determine a transmission mode corresponding to the interactive information, the transmission mode corresponding to the interactive information comprising at least one of transmission based on a network channel and transmission with a video stream fragment as a medium; and transmit the video stream to the target terminal;

the terminal being configured to receive the video stream transmitted by the server;

the server being further configured to transmit the interactive information to the terminal based on the transmission mode corresponding to the interactive information, the interactive information being transmitted at a time different than a time of transmitting the video stream; and the terminal being further configured to acquire the interactive information corresponding to the video stream transmitted by the server; and process interactive service on the video stream according to the interactive timestamp and the interactive data in the interactive information.

18. The interactive service processing system according to claim 17, wherein the interactive timestamp is a timestamp of a reference encoded video frame, and the reference encoded video frame is an encoded video frame corresponding to the interactive information in the video stream.

19. The interactive service processing system according to claim 17, wherein the transmission mode corresponding to the interactive information comprises transmission with the video stream fragment as the medium, and the interactive information to the target terminal is transmitted by:

adding the interactive information to a streaming media file in a form of a private label to obtain a target streaming media file; and transmit the target streaming media file to the target terminal.

20. The interactive service processing system according to claim 17, wherein the server is further configured to:

acquire, based on a first interface, first interactive information corresponding to the video stream, the first interactive information being interactive information generated by an internal management backend; or acquire, based on a second interface, second interactive information corresponding to the video stream, the second interactive information being interactive information that is not generated by the internal management backend.

* * * * *